(12) United States Patent
Kipp et al.

(10) Patent No.: US 8,440,296 B2
(45) Date of Patent: *May 14, 2013

(54) SHEAR PANEL BUILDING MATERIAL

(75) Inventors: Michael D. Kipp, Highland, UT (US); Dilworth L. Pugh, Mapleton, UT (US); Michael D. Ridges, American Fork, UT (US); William T. McCarvill, Salt Lake City, UT (US)

(73) Assignee: Ashtech Industries, LLC, Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/176,692

(22) Filed: Jul. 5, 2011

(65) Prior Publication Data

US 2012/0148812 A1 Jun. 14, 2012

Related U.S. Application Data

(63) Continuation of application No. 12/238,379, filed on Sep. 25, 2008, now abandoned, which is a continuation-in-part of application No. 12/077,951, filed on Mar. 21, 2008, now abandoned.

(60) Provisional application No. 60/919,509, filed on Mar. 21, 2007, provisional application No. 60/961,130, filed on Jul. 17, 2007, provisional application No. 61/002,367, filed on Nov. 8, 2007, provisional application No. 61/081,951, filed on Jul. 18, 2008.

(51) Int. Cl.
*B32B 9/04* (2006.01)
*B28B 5/00* (2006.01)

(52) U.S. Cl.
USPC .................. 428/318.4; 428/312.2; 428/313.3; 428/319.1; 428/402; 52/578; 264/241; 264/261

(58) Field of Classification Search ............... 428/319.1, 428/319.3, 319.7, 312.2, 313.3, 318.4, 402; 52/578; 264/241, 261
See application file for complete search history.

(56) References Cited

U.S. PATENT DOCUMENTS

| | | |
|---|---|---|
| 1,881,420 A | 10/1932 | Treadway |
| 1,914,345 A | 6/1933 | Roos |

(Continued)

FOREIGN PATENT DOCUMENTS

| | | |
|---|---|---|
| AU | 2004201393 | 10/2005 |
| EP | 0475302 | 3/1992 |

(Continued)

OTHER PUBLICATIONS

U.S. Appl. No. 12/612,675, filed Nov. 4, 2009; Michael D. Kipp; office action issued Mar. 23, 2012.

(Continued)

*Primary Examiner* — Hai Vo
(74) *Attorney, Agent, or Firm* — Thorpe North & Western LLP

(57) ABSTRACT

A shear panel building material that includes a first facing membrane, a core matrix disposed on a face of the first facing membrane, and a semi-rigid or rigid material attached to the core matrix. The core matrix can include microspheres having a size of about 200 microns to about 800 microns, sodium silicate, and ethylene vinyl acetate. In one aspect, the shear panel is substantially free from glue and cement.

15 Claims, 7 Drawing Sheets

U.S. PATENT DOCUMENTS

| | | |
|---|---|---|
| 3,045,709 A | 7/1962 | Rap |
| 3,501,419 A | 3/1970 | Bridgeford |
| 3,528,846 A | 9/1970 | Calmer et al. |
| 3,697,422 A | 10/1972 | Makcle |
| 3,703,394 A | 11/1972 | Hemming et al. |
| 3,769,770 A | 11/1973 | Deschamps et al. |
| 3,781,170 A | 12/1973 | Nakao et al. |
| 3,782,985 A | 1/1974 | Gebhardt |
| 3,933,513 A | 1/1976 | Mellows |
| 3,995,086 A | 11/1976 | Plungulan et al. |
| 4,025,686 A | 5/1977 | Zion |
| 4,074,482 A | 2/1978 | Klahr |
| 4,077,921 A | 3/1978 | Sharpe et al. |
| 4,079,162 A | 3/1978 | Metzger |
| 4,083,159 A | 4/1978 | Hatch et al. |
| 4,090,887 A | 5/1978 | Marquise et al. |
| 4,292,348 A | 9/1981 | Dolan |
| 4,303,061 A | 12/1981 | Torobin |
| 4,303,431 A | 12/1981 | Torobin |
| 4,303,433 A | 12/1981 | Torobin |
| 4,303,603 A | 12/1981 | Torobin |
| 4,303,721 A | 12/1981 | Rodriguez |
| 4,303,729 A | 12/1981 | Torobin |
| 4,303,730 A | 12/1981 | Torobin |
| 4,303,732 A | 12/1981 | Torobin |
| 4,303,736 A | 12/1981 | Torobin |
| 4,332,618 A | 6/1982 | Ballard |
| 4,357,436 A | 11/1982 | Zucker et al. |
| 4,364,790 A | 12/1982 | Delcoigne et al. |
| 4,377,414 A | 3/1983 | Buschmann et al. |
| 4,415,512 A | 11/1983 | Torobin |
| 4,424,196 A | 1/1984 | Palmer et al. |
| 4,424,300 A | 1/1984 | Udvardy et al. |
| 4,425,440 A | 1/1984 | Bioembergen et al. |
| 4,438,028 A | 3/1984 | Schmittmann et al. |
| 4,441,944 A | 4/1984 | Massey |
| 4,446,177 A | 5/1984 | Munoz et al. |
| 4,476,258 A | 10/1984 | Hiles |
| 4,492,732 A | 1/1985 | Murphy et al. |
| 4,502,901 A | 3/1985 | Burkard |
| 4,504,320 A | 3/1985 | Rizer et al. |
| 4,522,878 A | 6/1985 | Martin et al. |
| 4,548,196 A | 10/1985 | Torobin |
| 4,568,389 A | 2/1986 | Torobin |
| 4,582,534 A | 4/1986 | Torobin |
| 4,594,279 A | 6/1986 | Yoneno et al. |
| 4,594,368 A | 6/1986 | Salyer et al. |
| 4,596,845 A | 6/1986 | Koyama et al. |
| 4,623,390 A | 11/1986 | Delmonico |
| 4,632,876 A | 12/1986 | Laird et al. |
| 4,644,014 A | 2/1987 | Thomson et al. |
| 4,659,385 A | 4/1987 | Costopoulos et al. |
| 4,661,301 A | 4/1987 | Okada et al. |
| 4,661,533 A | 4/1987 | Stobby |
| 4,666,960 A | 5/1987 | Spain |
| 4,671,994 A | 6/1987 | Cochran, Jr. |
| 4,673,697 A | 6/1987 | Rowley |
| 4,680,239 A | 7/1987 | Yano et al. |
| 4,681,788 A | 7/1987 | Barito et al. |
| 4,686,244 A | 8/1987 | Dietlein et al. |
| 4,686,252 A | 8/1987 | Burge et al. |
| 4,687,752 A | 8/1987 | Peters |
| 4,721,160 A | 1/1988 | Parcevaux et al. |
| 4,731,389 A | 3/1988 | Christopher et al. |
| 4,741,782 A | 5/1988 | Styron |
| 4,744,842 A | 5/1988 | Webster et al. |
| 4,760,296 A | 7/1988 | Johnston et al. |
| 4,770,708 A | 9/1988 | Atkins et al. |
| 4,780,484 A | 10/1988 | Schubert et al. |
| 4,798,753 A | 1/1989 | Abuaf et al. |
| 4,798,762 A | 1/1989 | Okada et al. |
| 4,839,394 A | 6/1989 | Champion |
| 4,861,097 A | 8/1989 | Wycech |
| 4,885,203 A | 12/1989 | Wakat |
| 4,901,500 A | 2/1990 | Wycech |
| 4,904,709 A | 2/1990 | Hermele |
| 4,933,031 A | 6/1990 | Blomberg et al. |
| 4,940,676 A | 7/1990 | Evans |
| 4,950,627 A | 8/1990 | Tokarz et al. |
| 4,960,184 A | 10/1990 | Woodward |
| 4,963,420 A | 10/1990 | Jarrin et al. |
| 4,988,478 A | 1/1991 | Held |
| 5,064,266 A | 11/1991 | Sun et al. |
| 5,079,329 A | 1/1992 | Muhlfeld et al. |
| 5,091,256 A | 2/1992 | Bopp et al. |
| 5,094,111 A | 3/1992 | Collins et al. |
| 5,098,577 A | 3/1992 | McLaughlin et al. |
| 5,125,812 A | 6/1992 | Held |
| 5,126,192 A | 6/1992 | Chellis et al. |
| 5,134,179 A | 7/1992 | Felegi, Jr. et al. |
| 5,140,089 A | 8/1992 | Muhlfeld et al. |
| 5,141,972 A | 8/1992 | Sato |
| 5,147,722 A | 9/1992 | Koslow |
| 5,162,397 A | 11/1992 | Descamps et al. |
| 5,211,238 A | 5/1993 | Carpenter |
| 5,217,552 A | 6/1993 | Miyajima |
| 5,218,016 A | 6/1993 | Jarring et al. |
| 5,225,124 A | 7/1993 | Sorathia et al. |
| 5,228,494 A | 7/1993 | Rohatgi |
| 5,256,222 A | 10/1993 | Shepherd et al. |
| 5,302,634 A | 4/1994 | Mushovic |
| 5,342,566 A | 8/1994 | Schafer et al. |
| 5,359,735 A | 11/1994 | Stockwell |
| 5,369,147 A | 11/1994 | Mushovic |
| 5,393,794 A | 2/1995 | Sperber |
| 5,424,099 A | 6/1995 | Stewart et al. |
| 5,472,760 A | 12/1995 | Norvell |
| 5,476,343 A | 12/1995 | Sumner |
| 5,492,696 A | 2/1996 | Price et al. |
| 5,492,870 A | 2/1996 | Wilcox et al. |
| 5,506,046 A | 4/1996 | Andersen et al. |
| 5,508,072 A | 4/1996 | Andersen et al. |
| 5,512,324 A | 4/1996 | Paulus et al. |
| 5,534,058 A | 7/1996 | Strabala |
| 5,540,793 A | 7/1996 | Bals et al. |
| 5,543,186 A | 8/1996 | Andersen et al. |
| 5,549,859 A | 8/1996 | Andersen et al. |
| 5,571,592 A | 11/1996 | McGregor et al. |
| 5,574,561 A | 11/1996 | Boudreau et al. |
| 5,580,378 A | 12/1996 | Shulman |
| 5,582,670 A | 12/1996 | Andersen et al. |
| 5,600,930 A | 2/1997 | Drucker |
| 5,601,643 A | 2/1997 | Sivlerstrim et al. |
| 5,604,266 A | 2/1997 | Mushovic |
| 5,614,307 A | 3/1997 | Andersen et al. |
| 5,622,556 A | 4/1997 | Shulman |
| 5,624,737 A | 4/1997 | Fairbanks et al. |
| 5,626,954 A | 5/1997 | Andersen et al. |
| 5,631,097 A | 5/1997 | Andersen et al. |
| 5,679,145 A | 10/1997 | Andersen et al. |
| 5,683,772 A | 11/1997 | Andersen et al. |
| 5,711,362 A | 1/1998 | Rohatgi |
| 5,713,974 A | 2/1998 | Martin et al. |
| 5,725,652 A | 3/1998 | Shulman |
| 5,746,932 A | 5/1998 | Rendall et al. |
| 5,754,491 A | 5/1998 | Cushman |
| 5,766,686 A | 6/1998 | Perich et al. |
| 5,770,267 A | 6/1998 | Bullock, Jr. |
| 5,786,095 A | 7/1998 | Batdorf |
| 5,788,184 A | 8/1998 | Eddy |
| 5,795,102 A | 8/1998 | Corbishley |
| 5,798,151 A | 8/1998 | Andersen et al. |
| 5,810,961 A | 9/1998 | Andersen et al. |
| 5,814,250 A | 9/1998 | Dudt et al. |
| 5,817,230 A | 10/1998 | Groppo, Jr. et al. |
| 5,830,548 A | 11/1998 | Andersen et al. |
| 5,840,179 A | 11/1998 | Minkara et al. |
| 5,849,650 A | 12/1998 | Rorabaugh et al. |
| 5,862,772 A | 1/1999 | Yancey et al. |
| 5,866,641 A | 2/1999 | Ronden et al. |
| 5,884,960 A | 3/1999 | Wycech |
| 5,897,943 A | 4/1999 | Rohatgi |
| 5,899,256 A | 5/1999 | Rohatgi |
| 5,910,082 A | 6/1999 | Bender et al. |
| 5,913,002 A | 6/1999 | Jinag |
| 5,944,888 A | 8/1999 | Perich et al. |
| 5,948,323 A | 9/1999 | McLaughlin et al. |

| | | | | | | |
|---|---|---|---|---|---|---|
| 5,965,257 | A | 10/1999 | Ahluwalia | 6,713,008 | B1 | 3/2004 | Teeter |
| 5,971,631 | A | 10/1999 | Poole et al. | 6,716,293 | B1 | 4/2004 | Taymourian et al. |
| 5,980,980 | A | 11/1999 | Dichiara, Jr. et al. | 6,739,806 | B1 | 5/2004 | Szymanski et al. |
| 5,981,631 | A | 11/1999 | Ronden | 6,740,373 | B1 | 5/2004 | Swoboda et al. |
| 5,983,984 | A | 11/1999 | Auderhelde et al. | 6,743,830 | B2 | 6/2004 | Soane et al. |
| 5,988,396 | A | 11/1999 | Minkara et al. | 6,749,897 | B2 | 6/2004 | Naji et al. |
| 6,020,062 | A | 2/2000 | Questel et al. | 6,758,305 | B2 | 7/2004 | Gelin et al. |
| 6,022,912 | A | 2/2000 | Spitler et al. | 6,802,938 | B2 | 10/2004 | Mohan et al. |
| 6,058,979 | A | 5/2000 | Watkins | 6,811,603 | B2 | 11/2004 | Brothers et al. |
| 6,060,535 | A | 5/2000 | Villar et al. | 6,814,798 | B2 | 11/2004 | Vijn et al. |
| 6,074,727 | A | 6/2000 | Miller et al. | 6,831,876 | B1 | 12/2004 | Cartwright |
| 6,085,865 | A | 7/2000 | Delverdler et al. | 6,833,203 | B2 | 12/2004 | Bose et al. |
| 6,096,812 | A | 8/2000 | Hanafin et al. | 6,840,994 | B2 | 1/2005 | Krowl et al. |
| 6,103,360 | A | 8/2000 | Caldwell et al. | 6,846,529 | B2 | 1/2005 | Mohan et al. |
| 6,155,305 | A | 12/2000 | Sumner | 6,852,765 | B2 | 2/2005 | Decker et al. |
| 6,165,308 | A | 12/2000 | Chen et al. | 6,858,280 | B1 | 2/2005 | Allen et al. |
| 6,166,109 | A | 12/2000 | Spitler et al. | 6,865,811 | B2 | 3/2005 | Wycech |
| 6,183,852 | B1 | 2/2001 | Rorabaugh et al. | 6,872,440 | B1 | 3/2005 | Kiik et al. |
| 6,187,697 | B1 | 2/2001 | Jaffee et al. | 6,893,751 | B2 | 5/2005 | Naji et al. |
| 6,194,051 | B1 | 2/2001 | Gagas et al. | 6,901,713 | B2 | 6/2005 | Axsom |
| 6,207,738 | B1 | 3/2001 | Zuckerman et al. | 6,902,614 | B2 | 6/2005 | Ratomski et al. |
| 6,231,970 | B1 | 5/2001 | Andersen et al. | 6,910,507 | B2 | 6/2005 | Simon et al. |
| 6,245,842 | B1 | 6/2001 | Buxton et al. | 6,916,863 | B2 | 7/2005 | Hemmings et al. |
| 6,251,979 | B1 | 6/2001 | Luongo | 6,919,111 | B2 | 7/2005 | Swoboada et al. |
| 6,265,040 | B1 | 7/2001 | Neale et al. | 6,939,610 | B1 | 9/2005 | Kaul |
| 6,277,454 | B1 | 8/2001 | Neale et al. | 6,953,129 | B2 | 10/2005 | DeLay |
| 6,280,759 | B1 | 8/2001 | Price et al. | 6,955,778 | B2 | 10/2005 | Huntermann |
| 6,309,492 | B1 | 10/2001 | Seidner | 6,960,388 | B2 | 11/2005 | Halissy et al. |
| 6,319,968 | B1 | 11/2001 | Bildner et al. | 6,974,494 | B1 | 12/2005 | Zahedi |
| 6,362,252 | B1 | 3/2002 | Prutkin | 6,988,343 | B1 | 1/2006 | Gleeson et al. |
| 6,368,527 | B1 | 4/2002 | Gonfmakher et al. | 6,995,098 | B2 | 2/2006 | McGrady et al. |
| 6,376,022 | B1 | 4/2002 | Mallow et al. | 7,021,018 | B2 | 4/2006 | Peng |
| 6,379,497 | B1 | 4/2002 | Sandstrom et al. | 7,037,572 | B2 | 5/2006 | Gleeson |
| 6,380,114 | B1 | 4/2002 | Brandy | 7,037,865 | B1 | 5/2006 | Kimberly |
| 6,387,447 | B1 | 5/2002 | Grimm et al. | 7,041,167 | B2 | 5/2006 | Jiang |
| 6,391,958 | B1 | 5/2002 | Luongo | 7,060,213 | B2 | 6/2006 | Pearce |
| 6,397,549 | B1 | 6/2002 | Baldwin | 7,073,585 | B2 | 7/2006 | Morgan et al. |
| 6,399,155 | B2 | 6/2002 | Child et al. | 7,074,499 | B2 | 7/2006 | Schnurer et al. |
| 6,413,458 | B1 | 7/2002 | Pearce | 7,076,822 | B2 | 7/2006 | Pearce |
| 6,417,125 | B1 | 7/2002 | Rorabaugh et al. | 7,083,758 | B2 | 8/2006 | Tremblay |
| 6,420,034 | B1 | 7/2002 | Takahashi et al. | 7,090,918 | B2 | 8/2006 | Leroux et al. |
| 6,432,482 | B1 | 8/2002 | Jaffee et al. | 7,091,277 | B2 | 8/2006 | Rydin et al. |
| 6,444,162 | B1 | 9/2002 | Anshits et al. | 7,101,607 | B2 | 9/2006 | Mollendorf et al. |
| 6,444,594 | B1 | 9/2002 | Child et al. | 7,115,542 | B2 | 10/2006 | Tranter et al. |
| 6,458,412 | B2 | 10/2002 | Child et al. | 7,155,868 | B2 | 1/2007 | Cole et al. |
| 6,472,579 | B1 | 10/2002 | Anshits et al. | 7,156,174 | B2 | 1/2007 | Roddy et al. |
| 6,491,984 | B2 | 12/2002 | Rigosi et al. | 7,156,914 | B2 | 1/2007 | Shimanovich |
| 6,503,976 | B2 | 1/2003 | Zuckerman et al. | 7,159,368 | B2 | 1/2007 | Peng |
| 6,514,362 | B1 | 2/2003 | Zuckerman et al. | 7,166,355 | B2 | 1/2007 | Jahns et al. |
| 6,531,222 | B1 | 3/2003 | Tanaka et al. | 7,174,962 | B1 | 2/2007 | Roddy et al. |
| 6,534,176 | B2 | 3/2003 | Terase et al. | 7,204,065 | B2 | 4/2007 | Naji |
| 6,545,066 | B1 | 4/2003 | Immordino, Jr. et al. | 7,217,458 | B2 | 5/2007 | Liu et al. |
| 6,551,701 | B1 | 4/2003 | Nohr et al. | 7,291,234 | B2 | 11/2007 | Glorioso |
| 6,559,082 | B1 | 5/2003 | Desvignes et al. | 7,318,288 | B2 | 1/2008 | Zahedi et al. |
| 6,569,923 | B1 | 5/2003 | Slagter | 7,845,130 | B2 | 12/2010 | Tonyan et al. |
| 6,572,697 | B2 | 6/2003 | Gleeson et al. | 8,349,444 | B2 | 1/2013 | Kipp et al. |
| 6,572,736 | B2 | 6/2003 | Bush et al. | 2001/0006704 | A1 | 7/2001 | Chen et al. |
| 6,576,574 | B2 | 6/2003 | Child et al. | 2001/0026802 | A1 | 10/2001 | Price et al. |
| 6,582,819 | B2 | 6/2003 | McDaniel et al. | 2001/0043996 | A1 | 11/2001 | Yamada et al. |
| 6,584,742 | B1 | 7/2003 | Kligler et al. | 2001/0051249 | A1 | 12/2001 | Gagas et al. |
| 6,586,353 | B1 | 7/2003 | Kiik et al. | 2002/0017224 | A1 | 2/2002 | Horton |
| 6,601,647 | B2 | 8/2003 | Brothers et al. | 2002/0054957 | A1 | 5/2002 | Johnsen et al. |
| 6,620,487 | B1 | 9/2003 | Tonyan et al. | 2002/0069603 | A1 | 6/2002 | Zomes |
| 6,630,221 | B1 | 10/2003 | Wong | 2002/0103091 | A1 | 8/2002 | Kodall |
| 6,631,603 | B2 | 10/2003 | Zomes | 2002/0112648 | A1 | 8/2002 | Krowl et al. |
| 6,631,766 | B2 | 10/2003 | Brothers et al. | 2002/0128142 | A1 | 9/2002 | Godeke et al. |
| 6,632,527 | B1 | 10/2003 | McDaniel et al. | 2002/0142022 | A1 | 10/2002 | Price et al. |
| 6,644,405 | B2 | 11/2003 | Vijn et al. | 2002/0157573 | A1 | 10/2002 | Pellet |
| 6,648,961 | B2 | 11/2003 | Brothers et al. | 2002/0170467 | A1 | 11/2002 | Naji et al. |
| 6,659,362 | B1 | 12/2003 | Halilissy et al. | 2002/0175126 | A1 | 11/2002 | Naji et al. |
| 6,660,078 | B2 | 12/2003 | Brothers et al. | 2002/0178672 | A1 | 12/2002 | Robinson et al. |
| 6,660,667 | B2 | 12/2003 | Zuckerman et al. | 2002/0179219 | A1 | 12/2002 | Naji et al. |
| 6,667,261 | B1 | 12/2003 | Zuckerman et al. | 2002/0189499 | A1 | 12/2002 | Naji et al. |
| 6,673,144 | B2 | 1/2004 | Immordino, Jr. et al. | 2003/0000424 | A1 | 1/2003 | Naji et al. |
| 6,673,432 | B2 | 1/2004 | Kiik et al. | 2003/0029360 | A1 | 2/2003 | Krowl et al. |
| 6,692,678 | B2 | 2/2004 | Krowl et al. | 2003/0054157 | A1 | 3/2003 | Taymourian et al. |
| 6,699,522 | B2 | 3/2004 | Sakakibara | 2003/0056696 | A1 | 3/2003 | Fenske et al. |
| 6,699,559 | B1 | 3/2004 | Milburn | 2003/0057594 | A1 | 3/2003 | Andersen et al. |
| 6,708,456 | B2 | 3/2004 | Kiik et al. | 2003/0087029 | A1 | 5/2003 | Decker et al. |

| | | |
|---|---|---|
| 2003/0096899 A1 | 5/2003 | Pearce |
| 2003/0126817 A1 | 7/2003 | Gleeson et al. |
| 2003/0126822 A1 | 7/2003 | Gleeson |
| 2003/0129348 A1 | 7/2003 | Peng |
| 2003/0131550 A1 | 7/2003 | Cole et al. |
| 2003/0134920 A1 | 7/2003 | Poisl et al. |
| 2003/0136072 A1 | 7/2003 | Peng |
| 2003/0153635 A1 | 8/2003 | Spitler et al. |
| 2003/0175497 A1 | 9/2003 | Kobe et al. |
| 2003/0205172 A1 | 11/2003 | Gleeson et al. |
| 2004/0003570 A1 | 1/2004 | Phillips et al. |
| 2004/0003759 A1 | 1/2004 | Brothers et al. |
| 2004/0022941 A1 | 2/2004 | Glorioso |
| 2004/0054035 A1 | 3/2004 | Hallissy et al. |
| 2004/0067352 A1 | 4/2004 | Hagerman et al. |
| 2004/0074184 A1 | 4/2004 | Naji |
| 2004/0081827 A1 | 4/2004 | Data et al. |
| 2004/0102534 A1 | 5/2004 | Orpin |
| 2004/0123555 A1 | 7/2004 | Cole |
| 2004/0157961 A1 | 8/2004 | Tullos et al. |
| 2004/0170873 A1 | 9/2004 | Smith |
| 2004/0171499 A1 | 9/2004 | Ravi et al. |
| 2004/0176486 A1 | 9/2004 | Glorioso et al. |
| 2004/0192148 A1 | 9/2004 | Kajander |
| 2004/0194421 A1 | 10/2004 | Canti |
| 2004/0194657 A1 | 10/2004 | Lally |
| 2004/0202810 A1 | 10/2004 | Peng |
| 2004/0211139 A1 | 10/2004 | Peng |
| 2004/0221529 A1 | 11/2004 | Zornes |
| 2004/0226098 A1 | 11/2004 | Pearce |
| 2004/0226099 A1 | 11/2004 | Pearce |
| 2004/0229986 A1 | 11/2004 | Pearce |
| 2004/0234595 A1 | 11/2004 | Mohammad |
| 2004/0235379 A1 | 11/2004 | Ahtuwalia et al. |
| 2004/0244654 A1 | 12/2004 | Allouche et al. |
| 2004/0249005 A1 | 12/2004 | Kron et al. |
| 2005/0011412 A1 | 1/2005 | Vijn et al. |
| 2005/0017396 A1 | 1/2005 | Pearce et al. |
| 2005/0019548 A1 | 1/2005 | Liu et al. |
| 2005/0019552 A1 | 1/2005 | Wiersma et al. |
| 2005/0025952 A1 | 2/2005 | Field et al. |
| 2005/0072087 A1 | 4/2005 | Fanucci et al. |
| 2005/0079352 A1 | 4/2005 | Glorioso et al. |
| 2005/0090615 A1 | 4/2005 | Fisher |
| 2005/0126441 A1 | 6/2005 | Skelhorn |
| 2005/0133183 A1 | 6/2005 | Mohan et al. |
| 2005/0137279 A1 | 6/2005 | Decker et al. |
| 2005/0153070 A1 | 7/2005 | Decker et al. |
| 2005/0176833 A1 | 8/2005 | Tay |
| 2005/0181693 A1 | 8/2005 | Kajander |
| 2005/0197444 A1 | 9/2005 | Kyte et al. |
| 2005/0202258 A1 | 9/2005 | Swales et al. |
| 2005/0252420 A1 | 11/2005 | Timmons |
| 2005/0255318 A1 | 11/2005 | Czemy |
| 2005/0256228 A1 | 11/2005 | Ariel |
| 2005/0281997 A1 | 12/2005 | Grah |
| 2005/0287293 A1 | 12/2005 | Rothman |
| 2005/0288394 A1 | 12/2005 | Rothman et al. |
| 2006/0000155 A1 | 1/2006 | Wagner |
| 2006/0016617 A1 | 1/2006 | Corbishley |
| 2006/0037815 A1 | 2/2006 | Schabel, Jr. |
| 2006/0040096 A1 | 2/2006 | Eadara et al. |
| 2006/0051595 A1 | 3/2006 | Gaudeus et al. |
| 2006/0054059 A1 | 3/2006 | Dubey et al. |
| 2006/0054061 A1 | 3/2006 | Ruddick |
| 2006/0059825 A1 | 3/2006 | Wiercinski et al. |
| 2006/0084743 A1 | 4/2006 | Chen |
| 2006/0096074 A1 | 5/2006 | Foster et al. |
| 2006/0099405 A1 | 5/2006 | Gulselin et al. |
| 2006/0101785 A1 | 5/2006 | Wiercinski et al. |
| 2006/0144005 A1 | 7/2006 | Tonyan et al. |
| 2006/0147681 A1 | 7/2006 | Dubey |
| 2006/0160914 A1 | 7/2006 | Orpin |
| 2006/0165885 A1 | 7/2006 | Fay |
| 2006/0168906 A1 | 8/2006 | Tonyan et al. |
| 2006/0174572 A1 | 8/2006 | Tonyan et al. |
| 2006/0177661 A1 | 8/2006 | Smith et al. |
| 2006/0178453 A1 | 8/2006 | Bohler |
| 2006/0178461 A1 | 8/2006 | Bohler et al. |
| 2006/0185267 A1 | 8/2006 | Tonyan et al. |
| 2006/0188674 A1 | 8/2006 | Fernette et al. |
| 2006/0216471 A1 | 9/2006 | Grah et al. |
| 2006/0253988 A1 | 11/2006 | Pearce |
| 2006/0260811 A1 | 11/2006 | Nguyen et al. |
| 2006/0269738 A1 | 11/2006 | Kimberly |
| 2006/0280970 A1 | 12/2006 | Lettkeman et al. |
| 2007/0020475 A1 | 1/2007 | Prince et al. |
| 2007/0027227 A1 | 2/2007 | Shutov |
| 2007/0027234 A1 | 2/2007 | Sigworth et al. |
| 2007/0044397 A1 | 3/2007 | Wiercinski et al. |
| 2007/0048445 A1 | 3/2007 | DiMario |
| 2007/0048504 A1 | 3/2007 | DiMario |
| 2007/0054797 A1 | 3/2007 | Thomas |
| 2007/0056476 A1 | 3/2007 | Roddy et al. |
| 2007/0062143 A1 | 3/2007 | Noushad |
| 2007/0077436 A1 | 4/2007 | Naji et al. |
| 2007/0093392 A1 | 4/2007 | Vavra et al. |
| 2007/0094992 A1 | 5/2007 | Antonic |
| 2007/0130864 A1 | 6/2007 | Semmens et al. |
| 2007/0141316 A1 | 6/2007 | McGrath et al. |
| 2007/0148429 A1 | 6/2007 | McGrath et al. |
| 2007/0155859 A1 | 7/2007 | Song et al. |
| 2007/0175126 A1 | 8/2007 | Tonyan et al. |
| 2007/0193143 A1 | 8/2007 | Antonic |
| 2007/0214676 A1 | 9/2007 | Zaheidi et al. |
| 2007/0237829 A1 | 10/2007 | Dadachova et al. |
| 2007/0261224 A1 | 11/2007 | McLeod |
| 2007/0294974 A1 | 12/2007 | Tonyan et al. |
| 2008/0098935 A1 | 5/2008 | Roth et al. |
| 2008/0099133 A1 | 5/2008 | Stivender |
| 2008/0099171 A1 | 5/2008 | Frank et al. |
| 2008/0101150 A1 | 5/2008 | George et al. |
| 2008/0101151 A1 | 5/2008 | Frank et al. |
| 2008/0110276 A1 | 5/2008 | Frank et al. |
| 2009/0004459 A1 | 1/2009 | Kipp et al. |
| 2009/0107059 A1 | 4/2009 | Kipp et al. |
| 2009/0239059 A1 | 9/2009 | Kipp et al. |
| 2009/0239429 A1 | 9/2009 | Kipp et al. |
| 2010/0016459 A1 | 1/2010 | Cernohous |
| 2010/0116405 A1 | 5/2010 | Kipp |

FOREIGN PATENT DOCUMENTS

| | | |
|---|---|---|
| EP | 1 016 757 | 7/2000 |
| EP | 1 038 898 | 9/2000 |
| EP | 1 272 340 | 4/2005 |
| EP | 1568489 | 8/2005 |
| GB | 1514239 | 6/1978 |
| GB | 2041384 | 9/1980 |
| GB | 2357111 | 6/2001 |
| JP | 5-269722 | 10/1993 |
| JP | 8-1854 | 1/1996 |
| JP | 09-156010 | 6/1997 |
| JP | 11-322880 | 11/1999 |
| JP | 11-351610 | 12/1999 |
| JP | 2002-144468 | 5/2002 |
| JP | 2006/083048 | 3/2006 |
| KR | 10-1996-7958 | 3/1996 |
| WO | WO 93/10972 | 6/1993 |
| WO | WO 93 16245 A1 * | 8/1993 |
| WO | WO 97/17508 | 5/1997 |
| WO | WO 99/44087 | 9/1999 |
| WO | WO 00/24577 | 5/2000 |
| WO | WO 00/27635 | 5/2000 |
| WO | WO 00/35847 | 6/2000 |
| WO | WO 00/36236 | 6/2000 |
| WO | WO 01/59381 | 8/2001 |
| WO | WO 01/66669 | 9/2001 |
| WO | WO 02/42064 | 5/2002 |
| WO | WO 02/060839 | 8/2002 |
| WO | WO 02/092927 | 11/2002 |
| WO | WO 02/092928 | 11/2002 |
| WO | WO 02/100957 | 12/2002 |
| WO | WO 03/045687 | 6/2003 |
| WO | WO 03/045688 | 6/2003 |
| WO | WO 03/046100 | 6/2003 |
| WO | WO 03/078735 | 9/2003 |
| WO | WO 2004/005640 | 1/2004 |
| WO | WO 2004/101903 | 11/2004 |

| | | |
|---|---|---|
| WO | WO 2005/003056 | 1/2005 |
| WO | WO 2005/016608 | 2/2005 |
| WO | WO 2006/000035 | 1/2006 |
| WO | WO 2006/007413 | 1/2006 |
| WO | WO 2006/018904 | 2/2006 |
| WO | WO 2006/034146 | 3/2006 |
| WO | WO 2006/065259 | 6/2006 |
| WO | WO 2006/071519 | 7/2006 |
| WO | WO 2006/071920 | 7/2006 |
| WO | WO 2006/073540 | 7/2006 |
| WO | WO 2006/073723 | 7/2006 |
| WO | WO 2006/081066 | 8/2006 |
| WO | WO 2006/081080 | 8/2006 |
| WO | WO 2006/081155 | 8/2006 |
| WO | WO 2006/081156 | 8/2006 |
| WO | WO 2006/113379 | 10/2006 |
| WO | WO 2007/020657 | 2/2007 |
| WO | WO 2007/021653 | 2/2007 |
| WO | WO 2007/041272 | 4/2007 |
| WO | WO 2007/047318 | 4/2007 |
| WO | WO 2007/056629 | 5/2007 |
| WO | WO 2007/075693 | 7/2007 |
| WO | WO 2007/079104 | 7/2007 |
| WO | WO 2007/081645 | 7/2007 |
| WO | WO 2007/097988 | 8/2007 |
| WO | WO 2008/002511 | 1/2008 |
| WO | WO 2008/003147 | 1/2008 |
| WO | WO 2008/020768 | 2/2008 |
| WO | WO 2008/037001 | 4/2008 |
| WO | WO 2008/057273 | 5/2008 |
| WO | WO 2008/057274 | 5/2008 |
| WO | WO 2008/057275 | 5/2008 |
| WO | WO 2008/057390 | 5/2008 |
| WO | WO 2008/076376 | 6/2008 |

OTHER PUBLICATIONS

U.S. Appl. No. 12/238,399, filed Sep. 25, 2008; Michael D. Kipp; office action issued Jan. 31, 2012.
U.S. Appl. No. 13/176,688, filed Jul. 5, 2011; Michael D. Kipp; office action issued May 18, 2012.
The 3M Ceramic Microspheres brochure; 2010; 2 pages.
U.S. Appl. No. 13/176,688, filed Jul. 5, 2011; Michael D. Kipp.
U.S. Appl. No. 13/206,348, filed Aug. 9, 2011; Michael D. Kipp.
U.S. Appl. No. 12/612,675, filed Nov. 4, 2009; Michael D. Kipp; office action dated Aug. 21, 2012.
U.S. Appl. No. 13/176,688, filed Jul. 5, 2011; Michael D. Kipp; notice of allowance dated Sep. 7, 2012.
U.S. Appl. No. 13/206,348, filed Aug. 9, 2011; Michael D. Kipp; office action dated Sep. 26, 2012.
U.S. Appl. No. 12/612,675, filed Nov. 4, 2009; Michael D. Kipp; office action issued Dec. 19, 2012.
Cenosphere; www.wikipedia.com; page last updated Dec. 1, 2012; 2 pages.
U.S. Appl. No. 12/238,399; filed Sep. 25, 2008; Michael D. Kipp; notice of allowance dated Jan. 22, 2013.
US 5,695,691, 12/1997, McLaughlin et al. (withdrawn)

\* cited by examiner

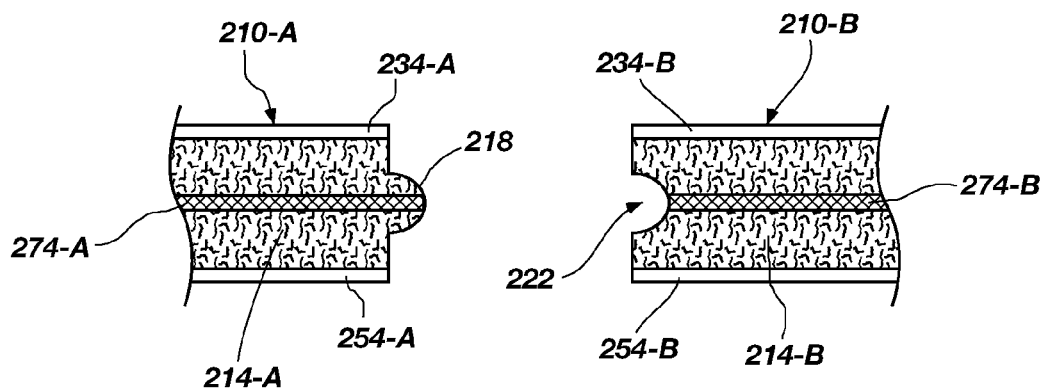
FIG. 5-A
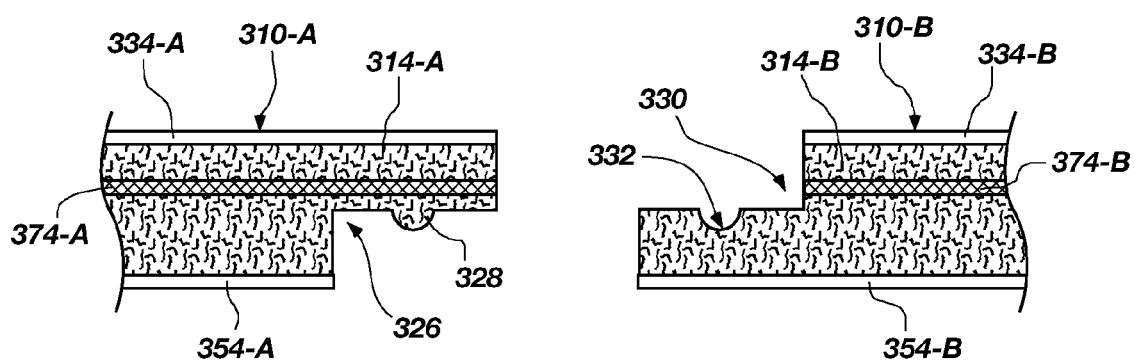
FIG. 5-B

SHEAR PANEL BUILDING MATERIAL

RELATED APPLICATIONS

This application is a continuation of U.S. patent application Ser. No. 12/238,379, filed on Sep. 25, 2008, which is a continuation-in-part of U.S. patent application Ser. No. 12/077,951, filed on Mar. 21, 2008, which claims the benefit of U.S. Provisional Patent Application No. 60/919,509, filed on Mar. 21, 2007, and of U.S. Provisional Patent Application No. 60/961,130, filed on Jul. 17, 2007, and of U.S. Provisional Patent Application No. 61/002,367, filed on Nov. 7, 2007, and U.S. Provisional Patent Application No. 61/081,951, filed on Jul. 18, 2008, all of which are each incorporated by reference herein in their entireties.

FIELD OF THE INVENTION

The present invention relates generally to building materials, and more particularly to shear panels or shear-type building materials. Accordingly, the present invention involves the fields of chemistry, chemical engineering, manufacturing engineering, construction, and materials science.

BACKGROUND OF THE INVENTION AND RELATED ART

Shear panels, as they are generically known as, are common in the building industry, and are used primarily to construct shear walls. Common types of shear panels are constructed from wood, metal or concrete. There are several types of shear panels.

One particular type of shear panel used more frequently than others, particularly in residential construction, is oriented strand board or OSB, which is an engineered wood product formed by layering strands (flakes) of wood in specific orientations. Other types of shear panels include fiberboard, particle board, hardboard, masonite, plywood, just to name a few.

Several problems exist with these conventional types of shear panels. For example, they are poor sound attenuators, or rather they exhibit poor noise reduction properties. Stated differently, they transmit or pass through a large percentage of the sound they are exposed to. Thus, when used to form exterior wall or flooring partitions, it is often necessary to equip the wall with insulation or other types of sound absorbing materials to improve the Sound Transmission Class (STC) rating across the created partition.

STC, part of ASTM International Classification E413 and E90, is a widely used standard for rating how well a building material attenuates airborne sound. The STC number is derived from sound attenuation values tested at sixteen standard frequencies from 125 Hz to 4000 Hz. These transmission-loss values are then plotted on a sound pressure level graph and the resulting curve is compared to a standard reference contour. Acoustical engineers fit these values to the appropriate TL Curve (or Transmission Loss) to determine an STC rating. STC can be thought of as the decibel reduction in noise that a wall or other partition can provide. The dB scale is logarithmic, with the human ear perceiving a 10 dB reduction in sound as roughly halving the volume. Therefore, any reduction in dB is significant. The reduction in dB for the same material depends upon the frequency of the sound transmission.

Another problem with conventional shear panels is that, by themselves, they have poor thermal insulating properties. They are typically combined with insulation or other heat resistant materials to provide a resulting walled partition with the needed resistance to heat transfer or heat loss. This significantly increases costs of building as additional materials and labor is required, while only providing minimum protection.

SUMMARY OF THE INVENTION

In light of the problems and deficiencies inherent in the prior art, the present invention seeks to overcome these by providing a shear panel building material including a microparticle-based core matrix, and a rigid material that imparts added strength and other characteristics to the shear panel building material.

In one aspect, a shear panel building material includes a first facing membrane, a core matrix disposed on a face of the first facing membrane, and a semi-rigid or rigid material attached to the core matrix. The core matrix can include microspheres having a size of about 200 microns to about 800 microns, sodium silicate, and ethylene vinyl acetate. In one aspect, the shear panel is substantially free from glue and cement.

There has thus been outlined, rather broadly, various features of the invention so that the detailed description thereof that follows may be better understood, and so that the present contribution to the art may be better appreciated. Other features of the present invention will become clearer from the following detailed description of the invention, taken with the accompanying claims, or may be learned by the practice of the invention.

BRIEF DESCRIPTION OF THE DRAWINGS

The present invention will become more fully apparent from the following description and appended claims, taken in conjunction with the accompanying drawings.

Understanding that these drawings merely depict exemplary embodiments of the present invention they are, therefore, not to be considered limiting of its scope. It will be readily appreciated that the components of the present invention, as generally described and illustrated in the figures herein, could be arranged and designed in a wide variety of different configurations. Nonetheless, the invention will be described and explained with additional specificity and detail through the use of the accompanying drawings in which:

FIG. 5-A illustrates a detailed partial end view of a shear panel building material having a coupling system formed therein in accordance with one exemplary embodiment of the present invention;

FIG. 5-B illustrates a detailed partial end view of a shear panel building material having a coupling system formed therein in accordance with another exemplary embodiment of the present invention;

DETAILED DESCRIPTION OF EXEMPLARY EMBODIMENTS

Figure 1:
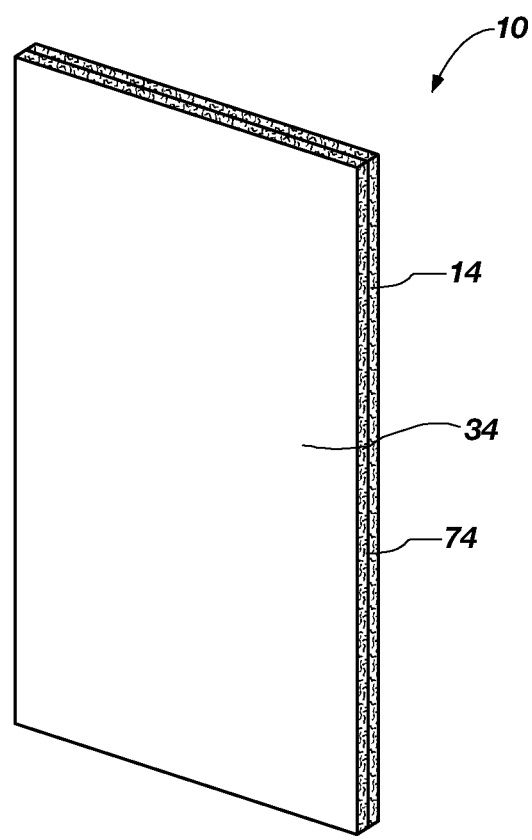
FIG. 1 illustrates a perspective view of a shear panel building material in accordance with one exemplary embodiment of the present invention.

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

The following detailed description and exemplary embodiments of the invention will be best understood by reference to the accompanying drawings, wherein the elements and features of the invention are designated by numerals throughout.

The present invention describes a shear panel building material configured for use in constructing various structures, such as a shear wall, flooring, etc., similar to prior related shear panel materials. The shear panel building material helps to counter the effects of lateral and other loads acting on the structure. However, the present invention shear panel building material is also capable of being utilized in other non-traditional applications, such as applications specifically directed at attenuating or deadening sound, applications directed at insulating a structure, etc.

The shear panel building material comprises a core matrix disposed between opposing facing membranes or layers, at least one of which comprises a rigid material, namely metal. The other facing membrane may comprise a rigid material (e.g., metal or fiberglass) or a flexible material, such as the type of paper common on conventional drywall-type wallboard products, etc. The composition of the core matrix comprises a plurality of hollow, inert, lightweight naturally occurring or synthetic microspheres that are substantially spherical in geometry (hereinafter "microspheres"), as well as at least one binder configured to adhere or bind the microspheres together, and to form a plurality of voids present throughout the core matrix. The binder may comprise an inorganic binder solution, an organic or latex binder solution, or both of these in combination. The core matrix may also comprise various additives, fillers, reinforcement materials, etc. Each of the components of the present invention shear panel building material, as well as other features and systems, are described in greater detail below. Alternatively, the core matrix can be free from various additives and/or fillers and/or setting agents and/or reinforcement materials. In one aspect, the core matrix can be free from fibrous materials. In another aspect, the core matrix can be free from cementing agents, such as various forms of cement. In a further embodiment, the core matrix can be free from lime.

The present invention further describes a method for manufacturing a shear panel building material. The shear panel may be manufactured in accordance with the compositions and methods described in copending U.S. application Ser. No. 12/238,367, filed Sep. 25, 2008, and entitled, "Wallboard Materials Incorporating a Microparticle Matrix", which is incorporated by reference in its entirety herein.

In one aspect, the binder used in shear panel building material may comprise an inorganic binder solution, an organic or latex binder solution, or both of these in combination. The core matrix may also comprise various additives, fillers, reinforcement materials, etc. Alternatively, the core matrix can be free from one or more of additives, fillers, cements, and/or additional reinforcement materials. Each of the components of the present invention shear panel building material, as well as other features and systems, are described in greater detail below.

The present invention provides several significant advantages over prior related shear panel products, particularly Oriented Strand Board (OSB), particle board, etc., some of which are recited here and throughout the following more detailed description. First, the present invention shear panel building material provides enhanced thermal properties. For example, the present invention shear panel building material provides a much greater resistance to thermal heat transfer due to the composition of the core matrix. Second, the present invention shear panel building material provides enhanced acoustical properties. For example, the present invention shear panel building material provides a significantly better Sound Transmission Class (STC) rating. Third, the present invention shear panel building material is stronger and lighter. The properties of the present invention shear panel are similar to those of a wallboard building material having a similar core matrix, only the present invention shear panel building material is stronger, more waterproof/resistant, and more fire resistant.

Each of the above-recited advantages will be apparent in light of the detailed description set forth below, with reference to the accompanying drawings. These advantages are not meant to be limiting in any way. Indeed, one skilled in the art will appreciate that other advantages may be realized, other than those specifically recited herein, upon practicing the present invention.

In one aspect, the components of the core matrix may be modified to adjust the properties of the shear panel building material. For example, the core matrix composition may be configured to provide enhanced thermal insulation, fire resistance, acoustical insulation, mold retardant and/or other desirable properties. The shear panel building materials can provide enhanced filtering abilities. By varying the number, size, composition, and/or shape of microparticles, the binder material, the ratio of microparticles to binder and other optional components (e.g., surfactant), the processing steps and parameters, and other variables, the properties of the shear panel building material can be modified to desired functionality.

In general, the shear panel building materials of the present invention comprise a plurality of microparticles that are at least bound or adhered together, and preferably bonded together, by one or more binders to create a core matrix structure having a plurality of voids defined therein. Depending upon the selected composition, the shear panel may be configured to exhibit certain physical and performance properties, such as strength, flexibility, hardness, as well as thermal and/or acoustical properties, fire and/or mold resistant properties, etc.

Each of the above-recited advantages will be apparent in light of the detailed description set forth below, with reference to the accompanying drawings. These advantages are not meant to be limiting in any way. Indeed, one skilled in the art will appreciate that other advantages may be realized, other than those specifically recited herein, upon practicing the present invention.

In describing and claiming the present invention, the following terminology will be used in accordance with the definitions set forth below.

The singular forms "a," "an," and, "the" include plural referents unless the context clearly dictates otherwise. Thus, for example, reference to "a wallboard" includes reference to one or more of such wallboards, and reference to "the binder" includes reference to one or more of such binders.

As used herein, "substantially" refers to situations close to and including 100%. Substantially is used to indicate that, though 100% is desirable, a small deviation therefrom is acceptable. For example, substantially free of mold includes situations completely devoid of mold, as well as situations wherein a negligible amount of mold is present, as determined by the particular situation.

As used herein, the term "about" is used to provide flexibility to a numerical range endpoint by providing that a given value may be "a little above" or "a little below" the endpoint.

For purposes of discussion and interpretation of the claims as set forth herein, the term "building material," as used herein, shall be understood to mean various types of products or materials incorporating a matrix of microparticles (e.g., microspheres) adhered or bound together using one or more components, such as a binder of some kind, and specifically means shear panel building materials. The building materials may comprise other additives, components or constituents, such as setting agents, foaming agents or surfactants, water soluble polymers, and others. The building materials may comprise many different types, embodiments, etc., and may be used in many different applications.

The term "microparticle," as used herein, shall be understood to mean any naturally occurring, manufactured, or synthetic particle having an outer surface, and in some cases, a hollow interior. Generally, the microparticles referred to herein comprise a spherical or substantially spherical geometry having a hollow interior, known as microspheres. Other types of microparticles may include those made from wood, ground rubber, ground up plastic, sawdust, etc.

The term "core matrix," as used herein, shall be understood to mean the combination of microparticles and other constituents used to form the support matrix of the building materials. The microparticles may be combined with one or more binders, additives, setting agents, etc.

The term "multi-elevational" shall be understood to describe at least one surface of the core matrix of the building material, wherein the surface has formed therein a series of peaks and valleys (or protrusions and recesses) to provide an overall surface configuration having different surfaces located in different elevations and/or orientations. The multi-elevational surface configuration may be arbitrarily formed or patterned. In addition, the multi-elevational surface may be defined by any arbitrary or geometrically shaped protruding and recessed components.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc.

This same principle applies to ranges reciting only one numerical value. Furthermore, such an interpretation should apply regardless of the breadth of the range or the characteristics being described.

Figure 2:
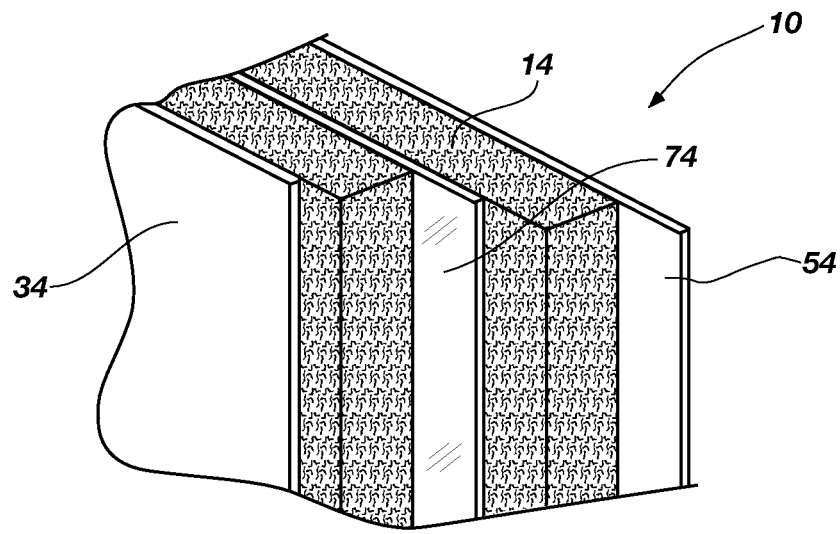
FIG. 2 illustrates a detailed partial perspective view of the shear panel building material.

With reference to FIGS. 1 and 2, illustrated are a general perspective view and a detailed perspective view, respectively, of a shear panel building material in accordance with one exemplary embodiment of the present invention. As shown, the shear panel building material 10 is in panel form having a size of approximately 4 ft. in width, and 8 ft. in length, and approximately ½ inch thick, which is the same size as most conventional shear panel products. Of course, other sizes such 4 ft. by 12 ft. sizes, as well as different thicknesses is also contemplated. The shear panel building material 10 is shown as comprising a core matrix 14 disposed between opposing facing membranes or layers, namely first facing membrane 34 and second facing membrane 54. The shear panel building material 10 is also shown as comprising a reinforcing member 74 disposed within the core matrix, also between the first and second facing membranes 34 and 54.

The core matrix 14 is comprised primarily of a plurality of microspheres and at least one binder, wherein the microspheres are at least bound or adhered together, and preferably bonded together, by the one or more binders to create a core matrix structure having a plurality of voids defined therein. The voids are formed from the point to point contact between the microspheres.

The microparticles contemplated for use herein may comprise many different types, sizes, shapes, constituents, etc. Although not limited to this, the microparticles used in the present invention building material will generally have a size ranging between about 10 and about 1500 microns, or between about 10 and 1000 microns, and preferably between about 200 and about 800 microns. In a specific embodiment, the microparticles have a size ranging from about 300 to about 600 microns. In another aspect, the microparticles can have an average mean particle size of about 350 microns to about 450 microns. The microspheres or microparticles can optionally have a bulk density of about 0.4 to about 0.6 g/ml, providing products that are much lighter than conventional building materials, such as oriented strand board (OSB). The size of the microparticles will depend upon the application and the performance characteristics desired. However, the particles should not be too large so as to cause any binder disposed thereon to run off or to not be effective. The size of the microparticles will also function to influence the permeability of the building material. The microparticles are intended to be compatible with any binders, additives, and/or facing sheets. The shell thickness of the microparticles may be kept to a minimum amount, provided the microparticles maintain structural integrity as desired in the core matrix material. In one aspect, the microparticles can have a shell thickness of less than about 30% of the diameter of the microparticle. Wherein the microparticles are not spherical, the diameter of the particle can be calculated based on the effective diameter of the particle, using the total area of the cross section of the particle and equating such area to a circumferential area and determining the diameter from that value. In a further embodiment, the shell thickness can be less than about 20% of the diameter of the microparticle.

In one exemplary embodiment, the microparticles may comprise hollow, inert, lightweight naturally occurring, glass particles that are substantially spherical in geometry, or shaped as microspheres. One particular type of microsphere is sold under the trademark Extendospheres™, which are manufactured and sold by Sphere One Corporation. A hollow interior is preferred as this will reduce the weight of the shear panel building material, as well as provide good insulating properties. Furthermore, in one aspect, the microspheres or microparticles maintain structural integrity and retain their hollow nature, or original formation to the exclusion of binder or other matrix materials infiltrating the hollow portions of the microspheres. In one aspect of this embodiment, the microspheres may comprise the naturally occurring hollow, inert, glass microspheres obtained from a fly ash byproduct, which microspheres are often referred to as cenospheres. These cenospheres may be separated from the other byproduct components present in the fly ash and further processed, such as to clean and separate these into desired size ranges. Cenospheres are comprised primarily of silica and alumina, and have a hollow interior that is filled with air and/or other gasses. They possess many desirable properties, such as a crush strength between 3000 and 5000 psi, low specific gravity and are able to endure extremely high temperatures (above 1800° F.). Although they are substantially spherical in overall shape, many are not true spheres, as many are fragmented, or comprise unsmooth surfaces caused by additional silica and/or alumina.

As noted, microparticles or microspheres can include an amount of air or other gasses within the hollow interior. Where possible, the composition of the gaseous material within the microsphere can optionally be selected so as to provide enhanced characteristics of the utility material. For example, the hollow interior can include a noble gas, such as argon, or other known insulating gasses, to improve the insulating properties of the overall utility material.

In another exemplary embodiment, the microspheres may comprise artificial hollow, spherical structures manufactured from a synthetic material. The advantage with having a synthetic material is the uniformity and consistency between microspheres, thus making their behavior and the behavior of the resulting core matrix and building material more predictable. However, these advantages may not be significant enough to justify their use, as synthetic microspheres are extremely expensive to manufacture and can be cost prohibitive in many applications. The use of naturally occurring microspheres over synthetic ones to form a building material may depend on several different factors, such as the intended application, and/or the desired performance properties or characteristics. In some applications, naturally occurring microspheres may be preferred while in others a synthetic type may be more desirable. In one aspect, however, a combination of naturally occurring microspheres and synthetic microspheres can be utilized together in the core matrix. The combination of microspheres can be a homogeneous or heterogeneous distribution throughout the utility material.

In one aspect, microspheres may be present in an amount between 25 and 60 percent by weight of the total core matrix, in wet mixture form. Preferably, the microspheres are present in an amount between about 30 and 40 percent by weight. Other amounts are further contemplated in the event other additives or fillers, such as perlite, or setting agents, such as Class C fly ash, are made part of the core matrix composition. It should be noted that fly ash, of any type, can be utilized as a filler material, and/or optionally as a source of cenospheres. In one aspect, Class C fly ash can be one or the only source of microspheres. Class C fly ash can, in one aspect, be included in a core matrix in an amount ranging from about 0.5 wt % to about 50 wt %. In one aspect, it can be present in combination with synthetically made microspheres at a ratio of Class C fly ash to synthetic microspheres of about 1:15 to about 15:1. In a further embodiment, Class C fly ash can be present in an amount of less than about ⅓ of the amount of microspheres. The Class C fly ash used can optionally include greater than about 80 wt % calcium aluminum silicates, and less than 2 wt % lime.

The present invention further comprises one or more binders operable to couple together the microspheres, and to facilitate formation of the porous core matrix. The microparticles or microspheres can be bound by any manner, including a physical cementing arrangement, chemically binding microspheres, merging boundaries of microspheres, etc. In a specific embodiment, the microspheres can be bound by a physical cementing arrangement, as held together in a matrix of binder, wherein the binder adheres or physically immobilizes the microspheres, but does not form covalent or other chemical bonding with the microspheres. The binder may be caused to adhere the microspheres together, wherein the binder is allowed to dry if water based, or cured in a high temperature environment if non-water based. In another aspect, the binder may be caused to be cross-linked, wherein the binder functions to bond the microspheres together to improve the water resistant properties of the building material.

The ratio of binder to microparticles may vary depending upon the shear panel building material to be formed. A higher ratio of binder to microparticles will result in a shear panel building material that is more solid and dense than one with a smaller ratio. Indeed, a smaller ratio of binder to microparticles will result in a more porous shear panel.

The present invention contemplates the use of many different types of binders, again depending upon the desired type of shear panel building material to be formed. Different binders may be selected as part of the composition to contribute to the makeup of the resulting shear panel building material and to help provide the shear panel building material with certain physical and performance properties.

Both water-based and non-water-based binders are contemplated for use. Any one of these may be used alone or in combination with another binder. Examples of general binder categories include, but are not limited to, thermoplastics, epoxy resins, curatives, urethanes, thermosets, silicones, and others.

In one exemplary embodiment, the binder comprises an inorganic binder, such as sodium silicates in one form or another, combined with an organic binder such as polyvinyl acetate copolymer or ethylene vinyl acetate. The ratio of these binders may vary. In one aspect, the ratio of inorganic binder to organic binder may be about 7:1 to about 10:1. Stated more generally, the inorganic binder may be present in an amount between 50 and 60 percent by weight of the total weight of the core matrix (or about 20 to about 36 wt % dry inorganic binder), in wet form (the binders comprise an amount of water, or are mixed with an amount of water), with the organic binder present in an amount between 5 and 15 percent by weight of the total weight of the core matrix, in wet form (or about 2 to about 6 wt % dry organic binder). The listed amounts can be based on the pure forms of the binder material (with the percent weight of the binders in the total core matrix discussed herein being reduced between 40 and 60 percent), e.g. on pure sodium silicate, or can be based on binder mixtures including optionally water, similar chemical forms, e.g. silicates, silicic acid salts, etc., and other additives. As a non-limiting example, a sodium silicate binder solution commercially sold includes from about 35 wt % to 40 wt % sodium silicate in solution. Furthermore, more than one type of inorganic and/or organic binder can be utilized simultaneously.

In a specific embodiment, the core matrix composition can contain between 400 g and 600 g of microspheres, mixed with between 600 g and 800 g of sodium silicate binder solution, and between 60 g and 100 g of ethylene vinyl acetate. Of course, other ranges are possible, depending upon the application. For example, it may be desirable to have between 200 g and 1500 g of sodium silicate or other binder mixed with between 300 and 800 g of microspheres, mixed with between 20 g and 180 g of ethylene vinyl acetate copolymer. Other ratios and ranges of each of the components of various compositions are contemplated. Furthermore, more than one organic binder could be used, as could more than one inorganic binder. In a specific example, the inorganic binder solution is present in an amount about 55.5% by weight of the total weight of the core matrix in wet mixture, with the binder solution comprising sodium silicate and water. More specifically, the inorganic binder solution comprises sodium silicate present in an amount between 40% and 60% by weight and water present in an amount between 40% and 60% by weight. In many cases, the inorganic binder solution will comprise a 1:1 ratio of sodium silicate to water. The sodium silicate may be pre-mixed and the solution provided in liquid form, or the sodium silicate may be in powder form and subsequently mixed with water.

In one aspect, the latex or organic binder can be present in an amount about 7.4% by weight of the total weight of the core matrix in wet mixture, and comprises an ethylene polyvinyl acetate (EVA) emulsion. The latex binder facilitates formation of a flexible, porous composition that is subsequently formed into the core matrix of the shear panel. One particular example of latex binder used is ethylene vinyl acetate (water-based binder) sold under the trademark Airflex (e.g., Airflex 420), which is manufactured and sold by Airproducts, Inc. This particular binder is used to facilitate the flowable and formable formation of the core matrix, as well as to provide either flexible or semi-rigid compositions. The latex binder can be pre-mixed with water to be in liquid form. The latex binder comprises EVA present in an amount about 40% by weight, and water present in an amount about 60% by weight. In one aspect, the latex binder can range from about 2.5 wt % to about 30 wt % of the total weight of the core matrix in wet mixture. In a further aspect, the latex binder can range from about 5 wt % to about 20 wt %. Non-limiting examples of latex binders include those produced by Airflex (including specifically 323, 401, 420, 426), those produced by UCAR (specifically 154s, 163s), conventional glues and pastes, those produced by Vinac (including XX210), and mixtures and combinations thereof.

Optionally, water soluble polymers can be included in the core matrix formulation. The water soluble polymer may be added to the core matrix composition already dissolved in water or in dried form. The function of the water soluble polymer is to serve as a stabilizer for any surfactant or foaming agent present in the mixture. Specifically, the water soluble polymer helps to stabilize the composition until the binder is either cured or cross-linked. Non-limiting examples of water soluble polymers that can be included in the formulation include those distributed by Airflex, such as polyethylene oxide, such as, e.g., WSR 301. The water soluble polymer can also function as a thickener and prevent the water from running out. Such polymers can be useful to control the stiffness, flexibility, tear strength, and other physical properties of the building material, as well as to stabilize any surfactants, if present. In some embodiments, it may be desirable to eliminate, or at least significantly reduce, the amount of organic components in the core matrix composition. This is particularly the case in the event it is desirable that the building material comprise more enhanced fire resistant properties. The amount of organic components remaining in the core matrix composition, therefore, may be dependent upon the particular application.

Airflex products further include, and therefore the core matrix composition further includes, a water soluble polymer namely a polyethylene oxide, such as WSR 301. The water soluble polymer functions as a thickener and prevents the water from running out. These also are used to control the stiffness, flexibility, tear strength, and other physical properties of the shear panel, as well as to stabilize any surfactants, if present.

As mentioned, depending upon the type used, the binder may be simply cured, with no cross-linking, or it may be caused to polymerize or cross-link. By cross-linking the binder(s), a stronger more permanent physical coupling occurs between the binder and the microparticles. As such, the present invention contemplates using one or more means to effectively cross-link the binders. In one exemplary embodiment, the binders may be cross-linked by elevating the temperatures of the binders to a suitable temperature for a suitable period of time to effectuate polymerization and bonding. This may be done using conventional radiant heating methods, or it may be done using microwaves applied continuously or at various intervals, as well as with microwaves of different intensities. Using microwaves is significantly faster, and much more cost effective. In addition, cross-linking with microwaves functions to produce a stronger shear panel building material as the amount of binder actually cross-linked is increased.

Cross-linking within a shear panel building material provides significant advantages over a shear panel building material having an engineered wood product composition that is not cross-linked. For example, with cross-linking, the binders are made stronger, they do not absorb water as easily, and the connection between microparticles is much stronger. In addition, the shear panel building material does not weaken over time. Other advantages may be realized by those skilled in the art. Having said this though, there may be applications where cross-linking is not preferred, and where a non-bonded composition is better suited. This of course, is contemplated herein.

The present invention further contemplates utilizing a surfactant or foaming agent, mixed with the binder and the microparticles to achieve a shear panel building material having a relatively low density.

With respect to a foaming process, once ingredients are combined, they are whipped or agitated to introduce air into the mixture, and then dried. Mechanical agitation or compressed air may be used to physically introduce air into the mixture and to create the foaming process. The foaming process effectively causes microparticles to be supported in a much more separated position with respect to one another as compared to a non-foamed composition. With the presence of the foam, the microparticles suspended and are able to dry in more dispersed configurations. In another aspect, the suspension of the microparticles due to the presence of the foaming agents may also function to make certain core matrix compositions more flowable or pumpable, as well as more formable.

Non-limiting examples of surfactants or foaming agents include, anionic foaming agents, such as Steol FS406 or Bio-terge AS40, cationic foaming agents, and non-ionic foaming agents, etc.

The present invention further contemplates use of a water soluble polymer in the composition making up the shear panel building material. The water soluble polymer may be added to the core matrix composition already dissolved in water or in dried form. The function of the water soluble polymer is to serve as a stabilizer for any surfactant or foaming agent present in the mixture. Specifically, the water soluble polymer helps to stabilize the composition until the binder is either cured or cross-linked.

The density of the shear panel building material, namely the core matrix, having the composition just described is between 0.4 g/ml and 0.6 g/ml.

The core matrix 14 may further comprise one or more additives or fillers. These may be present in an amount between 0.01 and 50% by weight of the total weight of the core matrix in wet mixture. In one exemplary embodiment, the microparticles may be blended with expanded siliceous inorganic particles, such as perlite, to lower the density of the shear panel building material, decrease its weight, and reduce manufacturing costs. Specifically, it is contemplated that expanded siliceous inorganic particles may replace a portion of microparticles in an amount between 1% and 50% by weight of the total weight of the core matrix in wet mixture.

Alternatively, the core matrix can be substantially free of various additives and/or fillers. For example, the core matrix can optionally be free of any or all of fibrous discrete particles, fibrous materials, cements, glues, adhesives, etc. Furthermore, the shear panel building material, in one aspect, is not a laminate material. It should be noted, however, that multiple layers of shear panel and/or similar wallboard material can be layered into a laminate, if desired.

The core matrix may further comprise a setting agent configured or intended to enhance the water resistant properties of the building material, and particularly the core matrix of the building material. In one exemplary embodiment, the setting agent may comprise Class C fly ash. In another exemplary embodiment, the setting agent may comprise zinc oxide. In still another exemplary embodiment, the setting agent may comprise sodium fluorosilicate.

In exemplary core matrix compositions utilizing a setting agent, microspheres may be combined with an inorganic binder (e.g., sodium silicate solution (comprising sodium silicate and water)) in a 1:1 ratio, with the core matrix composition a setting agent present in an amount between about 10% and about 30% of the total weight of the inorganic binder. For example, the core matrix composition may comprise, as the setting agent, Class C fly ash present in an amount between 15 and 25% of the total weight of an inorganic binder. In another example, the core matrix composition may comprise, as the setting agent, either zinc oxide or sodium fluorosilicate present in an amount between about 5 and 15% of an inorganic binder. If an organic binder component is also to be used, such may be combined in an amount between 5 and 20% of the total weight of the inorganic binder component.

Unlike similar shear panel building materials formed having a microparticle/binder core matrix disposed between opposing paper facing membranes, the present invention shear panel building material 10 preferably comprises at least one stiff or rigid (or semi-stiff or semi-rigid) facing membrane to enhance the strength and other characteristics of the shear panel building material (e.g., to enhance the thermal characteristics, to enhance the sound attenuation characteristics, to function as a vapor barrier, etc.). However, two paper or other flexible facing membranes may be utilized, with a metal or other rigid material present as a reinforcing member in order to provide the enhanced functionality made possible by the rigid member. In another aspect, each of the facing membranes may comprise a rigid or semi-rigid metal or plastic material. In the exemplary embodiment shown, the first and second facing membranes 34 and 54 each comprise a paper facing sheet similar to that found on various types of drywall products. Of course, as stated, at least one or both of the first and second facing membranes may comprise a rigid or semi-rigid material. Indeed, the shear panel building material 10 may comprise many different types of materials or combination of materials, thus enabling the shear panel building material to exhibit various properties or characteristics.

In one aspect, the reinforcing member is a rigid material. The rigid material can, in one aspect, have substantially the same height and length as one or both facing membranes, and can optionally be arranged substantially parallel to at least one of the facing membranes. The rigid material can be a mesh or a continuous sheet of material. The rigid material may also be self-supporting, meaning that the rigid material has a defined shape and attachment to itself outside of attachment to or within the core matrix. To contrast, materials that are discrete particles or are materials that are infiltrated into other materials are not considered self-supporting.

The reinforcing member 74 optionally disposed between the outer facing sheets may also comprise many different types of materials. In addition, the shear panel building material 10 may comprise multiple or a plurality of reinforcing members located or positioned within the core matrix, between an outer surface of the core matrix and a facing sheet, or a combination of these. In one aspect, the reinforcing material 74 comprises a plastic or a plastic film. However the reinforcing material 74 may also comprise metals or metal alloys (quilted or non-quilted), fiberglass, fiberglass sheet/cloth, Kevlar, nylon, graphite/composites, plastic fibers/fabric, any kind of woven fabric, woven or nonwoven fibers or fiber sheets, and any combination of these as recognized by those skilled in the art. In addition, the reinforcing material may comprise any desired thickness. In another aspect, the reinforcing material 74 may comprise loose fibers that are mixed in with the microparticles and binder composition, thus being integral with the microparticles and binder within the core matrix. In the exemplary embodiment shown in FIG. 2, the reinforcing member 74 comprises an aluminum sheet sandwiched midway within the core matrix 14 between the facing membranes 34 and 54. The aluminum or quilted aluminum provides a sealing function, while also functioning to improve sound absorption and resist heat or thermal transfer. Aluminum is a good choice because it is lightweight, fire resistant, and provides added strength to the shear panel. However, other materials may be used, such as other metals, galvanized steel, plastic, etc. These would most likely also be quilted.

The reinforcing member 74 is configured to reinforce or enhance one or more properties or characteristics of the shear panel 10. For example, the reinforcing member 74 may be configured to reinforce against (or improve the resistance of) sound transmission, heat transfer or any combination of these. The reinforcing member 74 may also be configured to enhance the overall strength of the shear panel building material 10, thus further countering the effects of lateral loads acting on a structure built with the present invention shear panel building material. In one aspect, the shear strength of the shear panel can be about the same as an OSB of the same size.

Figure 3:
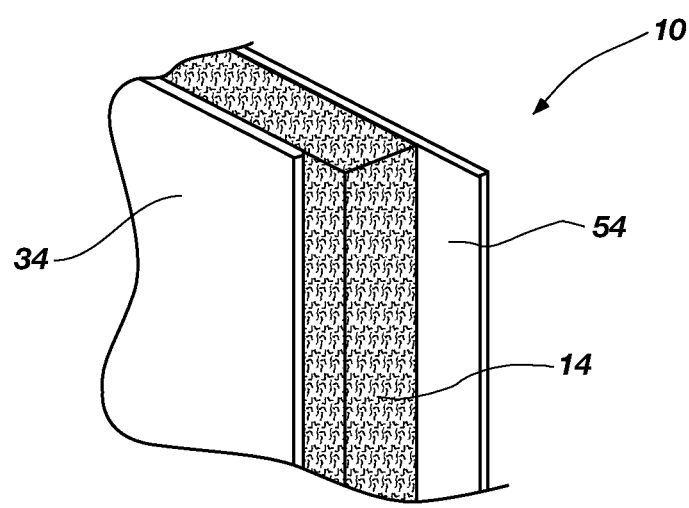
FIG. 3 illustrates a detailed partial perspective view of a shear panel building material in accordance with another exemplary embodiment of the present invention.

With reference to FIG. 3, illustrated is a shear panel building material in accordance with another exemplary embodiment of the present invention. In this particular embodiment, the shear panel 110 comprises many of the same components as the shear panel 10 discussed above and shown in FIG. 2. As such, the discussion above is incorporated herein, where appropriate and applicable. Unlike the shear panel 10 of FIG. 2, however, the shear panel 110 of FIG. 3 does not comprise a reinforcing material sandwiched within the core matrix 114. Rather, the shear panel 110 simply comprises a core matrix 114 disposed between a paper facing membrane 134 and a quilted aluminum facing membrane 154. Because no additional reinforcing material is used, the rigid or semi-rigid aluminum or other metal/plastic facing membrane 154 may comprise an increased thickness over the thickness of the same facing membrane of FIG. 2. However, such an increased thickness may not be necessary depending upon the application. No matter the location of the rigid or semi-rigid material, in one aspect, the thickness of the rigid or semi-rigid material can be from about 2 to about 3 lbs/sq. yd. In one aspect, the rigid material can be metal lathe as normally associated with masonry brick work.

Figure 4:
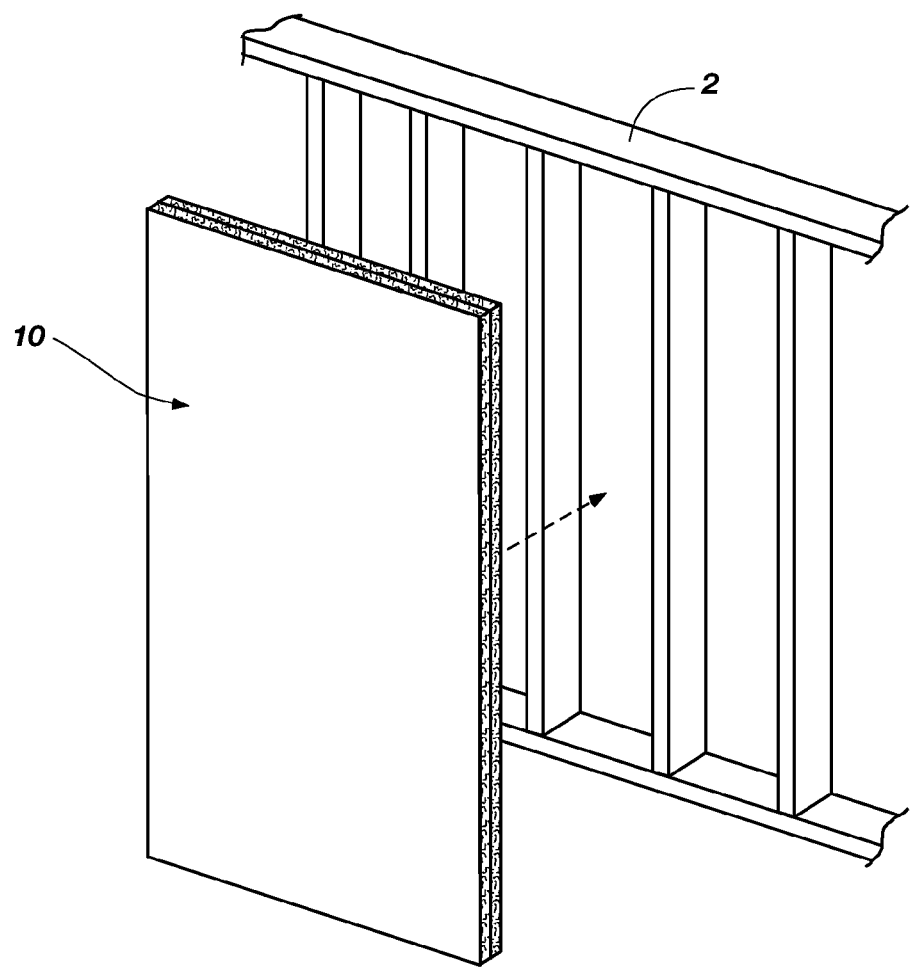
FIG. 4 illustrates a perspective view of a shear panel building material just prior to being installed or mounted onto a stud wall.

With reference to FIG. 4, illustrated is a shear panel building material 10, formed in accordance with one exemplary embodiment of the present invention, just prior to being installed on or hung from a stud wall 2. Specifically, shear panel building material 10 comprises the same components as that of FIG. 2. It should be noted that no specialized installation techniques are required for installing or hanging the shear panel building material 10. The shear panel building material 10 may be installed in a similar manner as conventional OSB or other similar shear panel products. However, FIGS. 5-A and 5-B illustrate other exemplary embodiments of shear panel building materials that may require one or more special installation techniques. These embodiments are discussed in detail below.

With reference to FIGS. 5-A and 5-B, illustrated are two different examples of coupling and sealing systems, each one being incorporated into a present invention shear panel building material, and each one being configured to couple adjacent shear panels together, and to seal or at least partially seal (e.g., not necessarily a strictly airtight seal) the adjacent shear panels. The coupling and sealing system is intended to reduce and/or eliminate the flanking path between the adjacent shear panels at the joint. The seal may be further enhanced or improved upon nailing, screwing or otherwise securing the joint to a stud in a stud wall. Indeed, the overlap shown is intended to be positioned about a stud, but this may or may not always be possible. The seal functions to resist sound transmission through the joint, and also to resist heat transfer through the joint, by creating a more complex flanking path for heat transfer and sound transmission. In other words, the flanking path is intended to be reduced and/or eliminated if possible by the coupling and sealing system of the present invention.

With specific reference to FIG. 5-A, illustrated are partial end views of a first shear panel building material 210-A and a second shear panel building material 210-B, each one formed in a manner as described herein, namely as comprising a core matrix 214-A and 214-B, respectively, first facing membranes 234-A and 234-B, respectively, and second facing membranes 254-A and 254-B, respectively, and reinforcing members 274-A and 274-B, respectively. The first shear panel building material 210-A comprises a protruding or male configuration 218 formed within and along an edge of the core matrix 214-A, which is intended to align and mate with a corresponding recess or female configuration 222 formed within and along an edge of the core matrix 214-B of the second shear panel building material 210-B. The coupling or connection is designed to secure the first and second shear panel building materials 210-A and 210-B, respectively, in a proper position with respect to one another, and to permit the edges of the membranes 234-A and 254-A of the first shear panel building material 210-A to meet the membranes 234-B and 254-B of the second shear panel building material 210-B. The coupling system further helps to maintain proper positioning after installation. The coupling system may be formed about any of the edges of the shear panel building material.

FIG. 5-B illustrates partial end views of a first shear panel building material 310-A and a second shear panel building material 310-B, each one formed in a manner as described herein, and including reinforcing members in the form of rigid members 374-A and 374-B, respectively. The first shear panel building material 310-A comprises a notch 326 formed within and along an edge of the core matrix 314-A, with the surface parallel to the surface of the membranes 334-A and 354-A optionally comprising a nub 328, also formed from the core matrix 314-A. The notch 326 is intended to align and mate with a corresponding notch 330 formed in the second shear panel building material 310-B to couple together the first and second shear panel building materials. The notch 326 optionally comprises a recess 332 that receives nub 328 therein when the first and second shear panel building materials are secured or coupled to one another. The coupling system shown in FIG. 5-B is intended to perform a similar function as the coupling system shown in FIG. 5-A.

It is noted that the coupling system is integrally formed into the core matrix during manufacture of the shear panel building material. The unique composition of the core matrix provides this capability. The particular size, shape or configuration of the coupling system may vary, and may be formed in accordance with various different manufacturing techniques.

It also contemplated that one or more sealing members or adhesives may be applied to the coupling system to enhance the sealing function achieved by coupling the two shear panels together.

Figure 6:
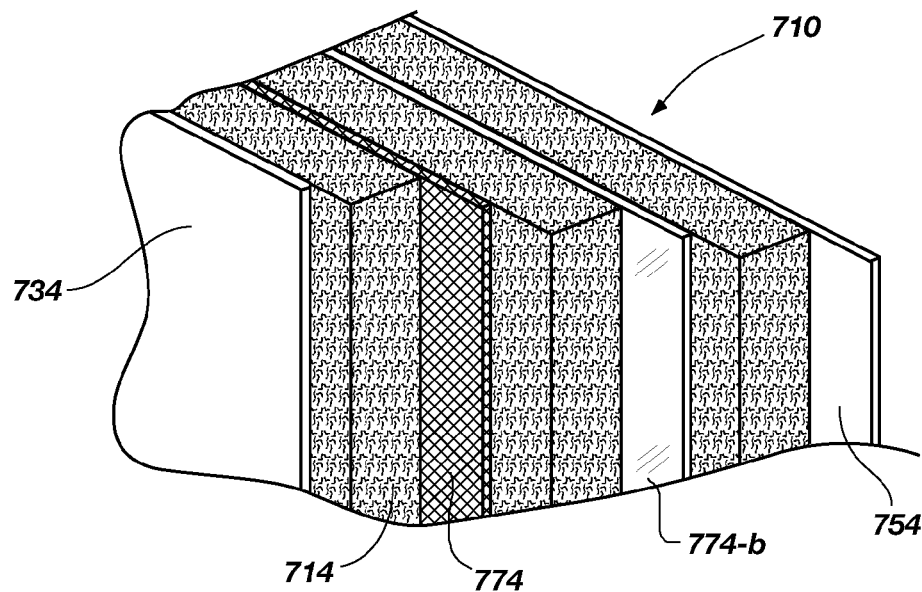
FIG. 6 illustrates a detailed partial perspective view of a shear panel building material in accordance with another exemplary embodiment of the present invention.

FIG. 6 illustrates a shear panel building material in accordance with still another exemplary embodiment of the present invention. In this particular embodiment, the shear panel 710 also comprises many of the same components as the shear panel 10 discussed above and shown in FIG. 2. As such, the discussion above is incorporated herein, where appropriate and applicable. However, unlike the shear panel of FIG. 2, the shear panel 710 comprises a core matrix 714 disposed between first and second paper facing membranes 734 and 754, as well as two reinforcing materials 774-*a* and 774-*b* disposed at evenly spaced positions within the core matrix 714. The first reinforcing material 774-*a* comprises a woven fabric. The second reinforcing material 774-*b* comprises an aluminum sheet. This particular embodiment illustrates that multiple or a plurality of reinforcing materials may be used, and positioned in various locations.

Figure 7:
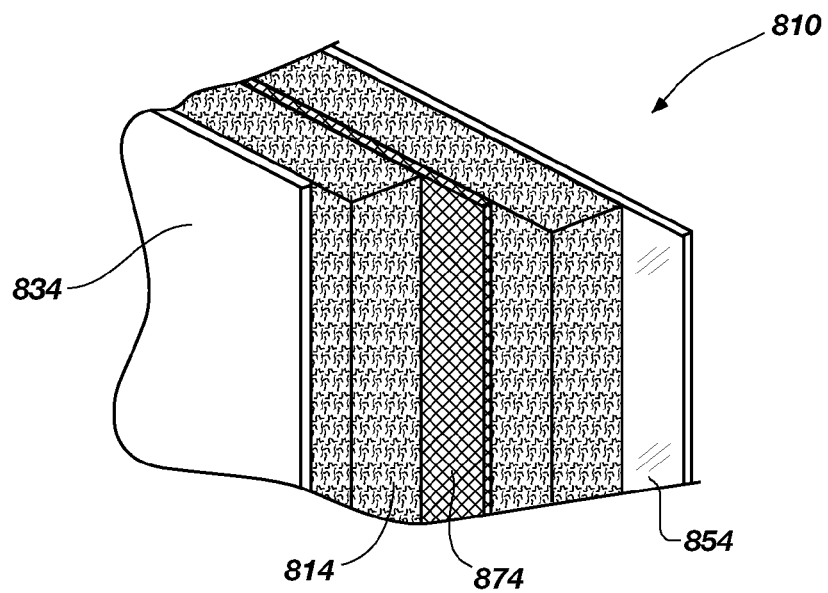
FIG. 7 illustrates a detailed partial perspective view of a shear panel building material in accordance with another exemplary embodiment of the present invention

FIG. 7 illustrates a shear panel building material in accordance with yet another exemplary embodiment of the present invention. In this particular embodiment, the shear panel 810 also comprises many of the same components as the shear panel 10 discussed above and shown in FIG. 2. As such, the discussion above is incorporated herein, where appropriate and applicable. However, unlike the shear panel of FIG. 2, shear panel 810 comprises a core matrix 814 disposed between a first paper facing sheet 834 and a second quilted aluminum facing membrane 854, with a reinforcing member 874 comprising a woven material being disposed or sandwiched within the core matrix 814.

From the foregoing description, and the corresponding drawings, it should be apparent to those skilled in the art that many different combinations and types of components may be used to provide a shear panel formed in accordance with the present invention, and with different performance characteristics.

The present invention shear panel building material provides many improved properties and characteristics over conventional shear panel building materials, such as OSB. For example, the present invention shear panel building material has a significantly lower heat transfer than OSB. In other words, the present invention shear panel is able to provide a much greater resistance to thermal heat transfer (e.g., for fire resistant or insulating applications) than OSB. The specific properties with respect to heat transfer may range or vary depending upon the makeup of the composition, such as the ratio of microparticles to binder, the type of binder(s) used, the location and type of a reinforcing material, etc. the type and thickness of the facing membranes, as discussed herein. In addition to weighing less, the present invention shear panel building material is significantly stronger than OSB.

Perhaps the most significant advantage over conventional shear panel products is the ability for the present invention shear panel building material to attenuate or absorb sound. Indeed, the Sound Transmission Class (STC) rating was found to be significantly better than OSB and other shear panel types.

The process used to make the present invention shear panel building material can be described generally by the following steps. The first binder solution is obtained. For example, a sodium silicate binder may be dissolved in water to form the first binder solution. Alternatively, a pre-mixed sodium silicate solution may be obtained. A second binder solution is obtained. For example, a polyvinyl acetate latex binder may be used. In addition, a water soluble polymer may be obtained. Alternatively, this may be included in the latex binder, such as is the case with the Airflex 420 product. The right size and quantity of microspheres are then blended with the first and second binders in a continuous process (e.g., in a static mixer) to obtain the formable core matrix composition, in wet mixture. The formable core matrix is then disposed from the static mixer onto a facing membrane supported within a forming pan. Alternatively, the formable core matrix may be disposed within a mold. An opposing facing member is added to the formable core matrix. Alternatively, a reinforcement material is added to the formable core matrix, with additional formable core matrix being subsequently added to the reinforcing material, and finally an opposing facing member added to the additional formable core matrix.

Each of these produce a green material product, which may then be subjected to pressure (e.g., from rollers, etc.) to compress the core matrix and facing membranes to a desired thickness. Once in proper form, the green material is subjected to elevated temperatures or microwaves to cure or cross-link the binder(s). In one exemplary embodiment, the green material is placed within an oven set between 200° and 400° F. for between 15 and 60 minutes in order to cure or cross-link the binders and to obtain the final shear panel building material product.

In another exemplary embodiment, the green material is subjected to microwave radiation to cure or cross-link the binders and to achieve the final shear panel product. Using microwaves is advantageous over oven curing in that the final shear panel product may be achieved in much quicker time. The green material may be subject to continuously occurring microwaves, or microwaves occurring in intervals. In addition, different power setting may be used to control the temperature within the green material. Any combination of microwave frequencies, duration of time, progressive increases or decreases in power, etc. may be employed as determined by one skilled in the art. However, the green material preferably is not exposed to microwaves that are so strong or for too long a duration so as to cause the water within the core matrix composition (e.g., the water within the binders) to boil. Boiling the water may tend to cause the microparticles to unduly separate, thus leaving large voids or defects in the core matrix. It is desirable to use microwaves to cause the water in the green material to steam and evaporate without creating steam pockets that would lead to the aforementioned voids. Therefore, the microwaves should be controlled so as to minimize the potential for such voids.

Exposing the green material to microwaves also functions to cure or cross-link the binders. As such, controlling the duration, frequency, power, etc. of the microwaves to effectuate cross-linking is contemplated.

Another advantage of using microwaves is that the green material is cured, the water evaporated, and the binders cross-linked from the inside out, rather than the outside in as with oven curing. This may result in a more uniform cross-link distribution, achieved in a much quicker time over oven curing.

It should be noted that in the event one of the facing membranes comprises a metal facing membrane, this may be added after formation (e.g., curing or cross-linking) of the core matrix. If the reinforcing material is metal, the building material may be formed by repeating the steps above, with the resulting two or more green materials being adhered or otherwise coupled together. In other words, a metal facing membrane or reinforcing material is intended to be added after formation of the core matrix.

The method of manufacturing the present invention shear panel building material may further comprise applying a binder solution to one or both of the facing membranes prior to disposing the core matrix thereon or therebetween. By applying it is meant that the facing membrane may be coated with a binder solution, or completely or partially saturated with the binder solution.

Upon heat curing, the water content of the shear panel building material can be less than about 5 wt %, and further less than about 2 wt % or even less than about 1 wt %.

The facing membrane 34, and/or 54 shown in FIG. 2, may comprise many different types of materials or combination of materials, and may comprise different properties. In one exemplary embodiment, facing membranes 34 and/or 54 can each be independently selected. One or both facing membranes can comprises a paper material similar to that found on various wallboard and/or shear panel products.

As the final product is desirably a cohesive one, in one aspect, the core material and facing sheet of the shear panel can be optimized for proper or superior adhesion, thus ensuring the facing sheet will remain secured to the core material. As such, additional binder or binders at the surface level can be utilized to improve adhesion of a facing sheet to the core matrix. Alternatively, a different adhesive agent can be utilized to improve adhesion of a facing sheet to the core matrix. As such, additional binder can be utilized to improve adhesion of a facing sheet to the core matrix. Alternatively, a different adhesive agent can be utilized to improve adhesion of a facing sheet to the core matrix.

A multi-elevational surface configuration may be utilized, wherein one face of the shear panel is without a facing membrane, and therefore exposed, and includes a non-planar facial arrangement. The purpose of providing a multi-elevational surface configuration formed about one surface, particularly the exposed surface, of the core matrix is at least twofold—1) to significantly further enhance the sound attenuation or damping properties of the building material, namely to ensure acoustic isolation and absorption over a wide range of frequencies, and 2) to enhance the flex strength of the building material by eliminating shear lines. As will be described below, many different multi-elevational surface configurations are contemplated herein. Those skilled in the art will recognize the benefits of providing a series of peaks and valleys about a surface to create different surfaces located in different elevations, as well as different surfaces oriented on different inclines, particularly for the specific purpose of attenuating sound. Sound waves incident on these different elevational and/or oriented surfaces are more effectively attenuated.

Figure 8:
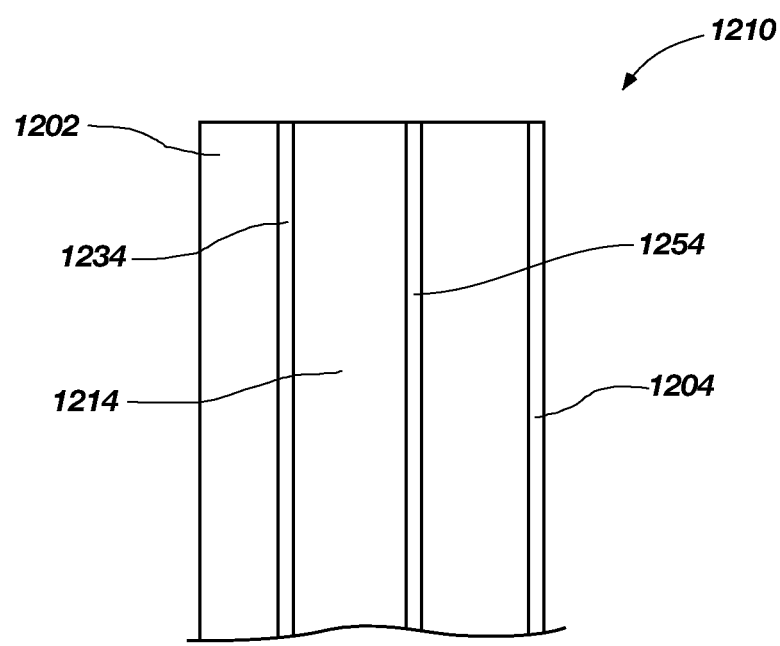
FIG. 8 illustrates a building material configured for use as a finishing material on an exterior of a structure.

Referring now to FIG. 8, illustrated is a building material formed in accordance with another exemplary embodiment. In this particular embodiment the building material 1210 comprises a core matrix 1214, a rigid material 1254 disposed or sandwiched within the core matrix 1214, and a facing sheet 1234 comprised of tar paper. With this configuration, the building material 1210 may be used as a finishing material on the exterior of residential or commercial structures, replacing stucco. The building material 1210, comprising pre-formed panels, can be mounted or secured to the exterior walls 1202 of a structure, say a residential home, much in the same way a wallboard is mounted or secured to the interior walls of a home. Once secured in place, a stucco finish 1204 commonly known in the art may be applied to the panels to create a finished look. The stucco finish can be applied so as to sufficiently conceal any seams or gaps between adjacent building material panels. Some obvious advantages that result from providing exterior finishing panels is the elimination of the labor intensive task of securing metal lath to the exterior walls, subsequently applying plaster over the metal lath, and then waiting several days for the plaster to dry and set prior to being able to apply the stucco finish. With the pre-formed building panels shown herein, installers can mount the panels and apply the stucco finish immediately, thus significantly reducing labor and costs.

It is contemplated that such a building panel may be applied to shear panels, such as oriented strand board, to shear panels formed after the manner of the present invention, or directly to a stud frame, wherein the building panel may function as the shear panel and also receive the stucco finish directly thereto, thus eliminating the need for a separate shear panel.

Shear panels as described herein exhibit superior qualities to many similar materials currently available. Furthermore, the superior qualities co-exist, where a material may exhibit both mold resistance and enhanced acoustic properties simultaneously. The core matrix won't grow mold. The shear panel is generally resistant to water, and even submersion in water for extended periods of time. The material can be formulated to be fire resistant.

Testing was completed on a wallboard composition, similar to the shear panel design but without a rigid member. The results generally are applicable to the shear panel as they both contain the same core matrix composition. The wallboard exhibits strong flexural strength up to two times that of conventional gypsum wallboard (e.g., 280 lbs vs. 140 lbs). Furthermore, the wallboard can withstand impacts without crumbling or displacement in surrounding areas such as a corner. the wallboard (including microspheres, sodium silicate, and an organic binder) was found to exhibit flexural strength range 137.2 lbf to 164.9 lbf, average 153 lbf; nail pull 72-87 lbf, average 78 lbf; weight of 4 inch by 8 inch by ½ inch sheet average 42.1 lbs; acoustic transmission based on a variety of frequencies ranging from 80 to 8000, average 50.9 db; R value range 16.2 to 19, average 17.5; mold resistance found no measurable mold growth; fire resistance testing found no combustion for exposure to propane torch flame for 15-120 minutes; and edge hardness 14-16 lbf, average 15.1 lbf. As shown, the wallboard material excels in a plurality of desirable qualities and provides a superior construction material.

Additional testing was completed on wallboard material (including microspheres, sodium silicate and vinyl acetate/ethylene copolymer, where the wallboard is ½" thick, the sodium silicate to cenosphere weight ratio is about 1:1, the sodium silicate to EVA weight ratio is about 10:1, the cenospheres are 300-600 microns). Unless otherwise noted, the testing was compared to baseline gypsum wallboard and the present invention board and gypsum wallboard were ½ inch thick. The following results were collected:

Surface finish—no noticeable difference in the surface finish.
Snap and dust—wallboard material of the present invention would snap cleaner with a straighter and more square line and did not produce the amount of dust that gypsum wallboard did.
Flexural strength—(according to ASTM C 473-03) gypsum wallboard had normal breaking at 140 lbs of force. The present invention wallboard had a minimum of 160 lbs force, with many samples obtaining 10-12% higher values.
Nail pull resistance—(according to ASTM C 473-03) 85-90 lb ft. compared to gypsum 77 lb ft.
Dimpling—dimpling yielded a more consistent pattern without crushing the board or creating micro fractures in localized areas. Gypsum board crushes and creates microfractures. Dimpling testing, along with nail and screw tests in extreme edges were similarly favorable.
Edge crush—(striking edges on right angle metallic surface of weighted samples) slight indentation, but relatively unharmed compared to gypsum being easily damaged.
Weight—with various component ratios, minimal weight reduction over gypsum wallboard was 20%, maximum weight reduction over 30%.
Mold growth—(according to ASTM D 3273) board was non-fungus nutrient and does not support mold growth.
Water resistance—(immersed board in water and tested frequently to see when core would soften) board withstood minimum of four days under water, totally submerged before softening was found. Many samples lasted more than one month without softening. Gypsum board softens within several hours and crumbles apart within about one day.
Fire resistance—(direct propane flame, torching one side of the material while measuring thermal rise on opposite side) flame side paper would scorch and smolder away with a time factor similar to the paper of gypsum, which was less than about 2 minutes. The board would then have a gradual thermal rise over the next 20 minutes to 350 degrees C. Gypsum board rises to 80 degrees C. in about 2 minutes and maintains that temperature for 5 minutes, then rises quickly to 400 degrees C. after 20 minutes.

K value—value of about 0.07 compared to gypsum board's K value of 0.11. This translates to gypsum's lower performance by transferring heat faster than the inventive board.

EXAMPLES

The following examples illustrate embodiments of the invention that are presently known. Thus, these examples should not be considered as limitations of the present invention, but are merely in place to teach how to make the best-known compositions and forms of the present invention based upon current experimental data. Additionally, some experimental test data is included herein to offer guidance in optimizing compositions and forms of the utility material. As such, a representative number of compositions and their method of manufacture are disclosed herein.

Example 1

Testing of Utility Material of Cenospheres and Sodium Silicate

A mixture of cenospheres of the form of Extendospheres™ and sodium silicate were combined and allowed to dry and form a fire-resistant insulating material Extendospheres™ of a 300-600 micron diameter size range were combined with sodium silicate solution (O type from PQ corporation) in a 1:1 weight ratio. The wet slurry was poured into a cavity around the turbine and allowed to dry. It formed a hardened mass of Extendospheres™ and sodium silicate. The material was tested with an Ipro-Tek single spool gas turbine. The tests showed that the material has a high insulation capacity, and the ability to withstand heat. The insulation was exposed to temperatures of up to 1200° C. However, it was found that when the material is exposed directly to flames for periods of more than a few minutes, it cracks and blisters and begins to lose physical strength.

Example 2

Formation of Mold to Form Wallboard

Figure 9:
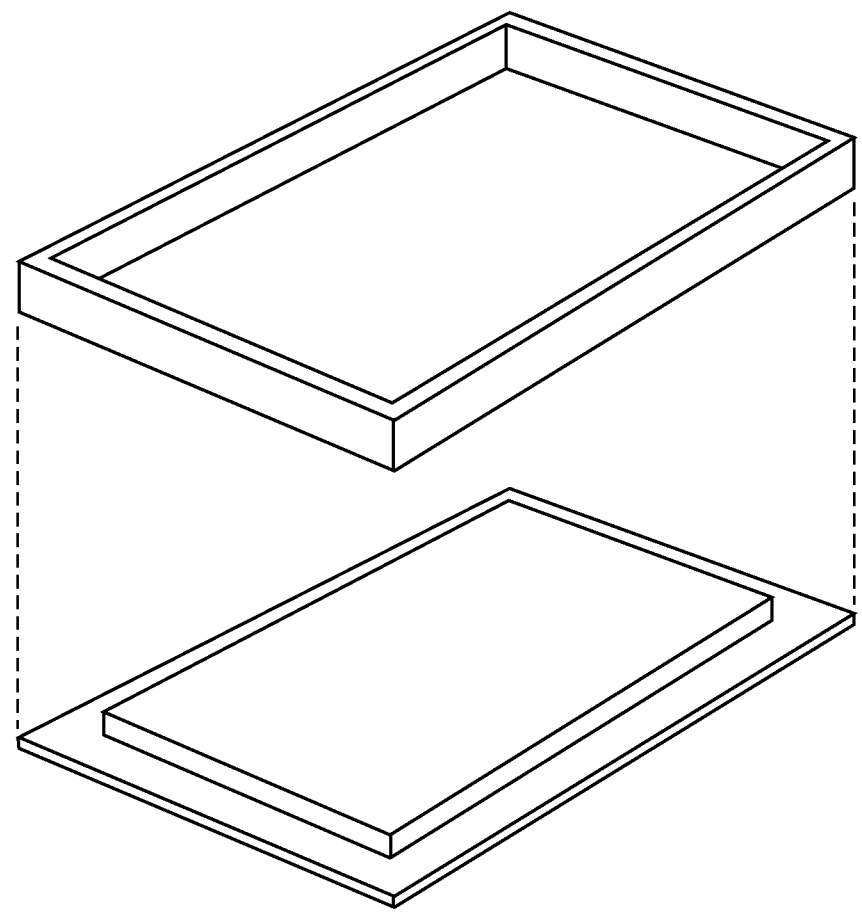
FIG. 9 illustrates a perspective view of a wood mold of for a bottom piece of a porous mold, in accordance with one aspect of the present invention.

In one aspect, the utility material can be wallboard panels. The panels can optionally be formed by exposing an uncured wallboard to microwaves. Such formation, as well as general wallboard formation, can utilize a mold. An example of a mold can be made up of a vinylester resin mold having top and bottom pieces. To form the vinylester resin mold, a wood mold is first constructed. The wood mold can be formed according to the shape and dimensions as illustrated in FIG. 9.

To form the vinylester resin mold, an outer mold of wood is attached to the base of the wood mold using double sided tape. Any releasable binder or means of attaching can be alternatively used. A resin mixture is formed of 97.5 wt % vinylester resin mixed with 2.5 wt % methyl ethyl ketone peroxide (MEKP) catalyst. Microspheres of the form of Extendospheres and the resin mixture are added in a 1:1 ratio to form a core mixture. The core mixture is mixed well using a stirring device that was mounted in a drill such as you would use to mix paint. Mix time was about 3 minutes. The core mixture is poured into the prepared wood mold and distributed to cover the full mold, including all corners. The mixture is gently smoothed out, although not pressed into the mold using short dropping, manual shaking, mechanical vibration, and spreading tools such as trowels. The mixture is not pressed into the wood mold as pressing it can decrease the porosity of the resulting vinylester resin mold and can make it unusable. The mixture is cured at room temperature until it is rigid and strong to the touch. The curing time is typically about three hours. The porous vinylester resin mold is then carefully removed. The resulting vinylester resin mold has a cavity 11.625 inches by 15.25 inches by 0.5 inches deep, with a 0.375 inch wall around the outside edge. A top piece for the vinylester resin mold is formed using the same procedure and results in a mold in a rectangle having dimensions of 12.375 inches by 16 inches by 0.5 inches deep.

Example 3

Preparation of Wallboard Using Mold

Figure 10:
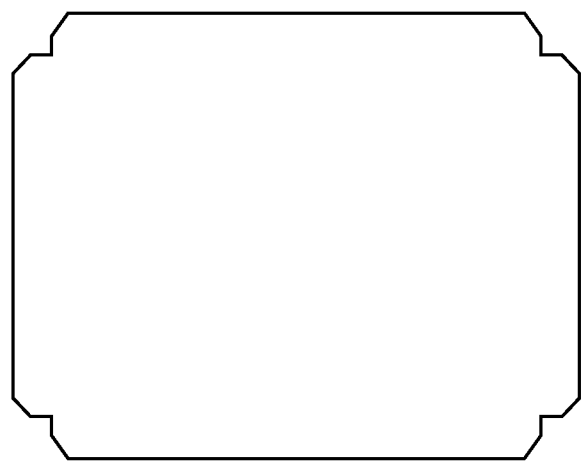
FIG. 10 illustrates a top view of a backing paper template, in accordance with one aspect of the present invention.

As noted, the utility material can be in the form of wallboard panels. The panels can optionally be formed by using the porous vinylester resin mold. First, a wallboard backing paper is cut using a backing paper template as shown in FIG. 10. Although a particular backing paper shape is illustrated, it should be understood that the backing paper can be of any shape or size sufficient to form a segment of wallboard. Facing paper is cut to a rectangle sized just smaller than the greater dimensions of the backing paper. In the present embodiment, the facing paper is cut to an 11.625 inch by 15.25 inch rectangle. The backing paper is folded and placed in the porous mold. A wallboard mixture may be formed using:

700 to 900 g microspheres
1100 to 1300 g sodium silicate solution, such as that sold by "O"
300 to 500 g latex binder
20 to 30 cc foaming agent Specifically, the foaming agent is added first to the sodium silicate solution and mixed using a squirrel mixer at 540 RPM for 2 minutes. The latex binder is added to the mixture and mixed for an additional 30 seconds on the same settings. The microspheres are added slowly while mixing, over 1 to 2 minutes, until the mixture is uniform.

The wallboard mixture is poured into the lined mold and leveled out using a spatula or paint stick. It should be noted that any tool or method could be used at this point to level the mixture. The mixture is further leveled by vigorous shaking. The sheet of facing paper is placed on top of the mixture and covered with the top panel of the vinylester resin mold. The mold is placed in a microwave and the panel is radiated for the desired amount of time. Preferably, the mold is turned often to produce a more even drying of the panel. The panel should not be subjected to continuous radiation for any extended amount of time to reduce or prevent large voids in the wallboard core. The power level of the microwave radiation can be set to control the amount of time the microwave is on. The time on and off of the microwave can be according to Table 1:

TABLE 1

| Power Level | Time On (Seconds) | Time Off (Seconds) |
| --- | --- | --- |
| 1 | 3 | 19 |
| 2 | 5 | 17 |
| 3 | 7 | 15 |
| 4 | 9 | 13 |
| 5 | 11 | 11 |
| 6 | 13 | 9 |
| 7 | 15 | |
| 8 | 17 | 5 |

TABLE 1-continued

| Power Level | Time On (Seconds) | Time Off (Seconds) |
|---|---|---|
| 9 | 19 | 3 |
| 10 | 22 | 0 |

Once properly heated, the resulting panel of wallboard can be carefully removed from the mold.

Example 4

Flexural Strength Testing

An important feature of wallboard is the flexural strength of the board. Each sample board was prepared by forming a core matrix material including the components outlined in Table 2 and spreading the mixture into a mold cavity and leveling it off. The resulting sample is 0.50 inches thick and 2 inches wide. Each sample is dried in an oven at 100° C. until dry as determined by Aquant moisture meter. The sample is suspended between two supports that are 6 inches apart so that 1-1.5 inches rests on either side of the support. A quart size paint can is placed in the center of the suspended sample and slowly filled with water until the sample breaks at which point the weight of the can is measured and recorded. Flexural strength is important for normal handling, installation, and use. Strength at least equal to gypsum wallboard was desired, for uses wherein the wallboard could replace conventional gypsum wallboard. Each wallboard includes a different composition as outlined in Table 2.

TABLE 2

| Run | Cenospheres (g) | Water (g) | Binder (type, g) | Foaming Agent (g) | Dry weight (g) | Weight to break (kg) |
|---|---|---|---|---|---|---|
| 1 | 50 | 6.0 | O, 52.4 | 1.0 | 70.2 | 5.0 |
| 2 | 50 | 0 | O, 87.2 | 2.0 | 83.7 | 20.6 |
| 3 | 50 | 14.1 | RU, 42.9 | 1.0 | 70.2 | |
| 4 | 50 | 14.4 | RU, 71.4 | 2.0 | 83.6 | 18.0 |
| Foam | 50 | 20 | RU, 71.4 | 16.4 | 83.6 | 9.2 |
| 5 | 50 | 8.0 | BW-50, 47.6 | 1.0 | 70.2 | 5.1 |
| 6 | 50 | 7.0 | BW-50, 79.2 | 2.0 | 83.7 | 7.4 |

The ingredients in each row were combined then mechanically whipped to produce a foamed product. The foamed product was then cast in a mold. All binders used are sodium silicate based. Type O binder is a viscous sodium silicate solution from PQ Corporation. Type RU binder is also from PQ Corporation and is a sodium silicate solution that is similar to O type but not as viscous. RU type is more watery and has a lower solids content. And, type BW-50 binder, also from PQ Corporation. BW-50 is also a sodium silicate solution, and has a lower ratio of silica to disodium oxide. As illustrated, the amount and type of binder can be optimized to create a wide range of flexural strengths.

Example 5

Flexural Strength Testing II

Flexural strength testing was conducted on seven sample boards according to the procedure outlined in Example 4. The components of each sample board and the flexural strength testing weight are recorded in Table 3.

TABLE 3

| Run | Cenospheres (g) | Water (g) | Binder (g) | Foaming Agent (g) | Dry weight (g) | Weight to break (kg) - no paper | Weight to break (kg) - Manilla folder | Weight to break (kg) - cardboard |
|---|---|---|---|---|---|---|---|---|
| 1 | 50 | 17.9 | 14.3 | 1.0 | 56.7 | | | |
| 2 | 50 | 15.5 | 28.6 | 1.0 | 63.5 | 2.06 | | |
| 3 | 50 | 12.1 | 42.9 | 1.0 | 70.2 | 11.96 | 21.55 | |
| 4 | 50 | 14.3 | 57.1 | 2.0 | 76.9 | 14.37 | | |
| 5 | 50 | 14.4 | 71.4 | 2.0 | 83.6 | 15.35 | 26.89 | 36.65 |
| 6 | 50 | 11.6 | 85.7 | 2.0 | 90.4 | 21.8 | | |
| 7 | 50 | 9.4 | 100.0 | 2.0 | 97.1 | 20.85 | 29.40 | 34.99 |
| Ceiling Tile ½" thick | | | | | | | 5.57 | |
| Dry wall ½" thick | | | | | | | 26.91 | |

As illustrated, increasing the density and increasing the binder content in the sample generally results in stronger samples. Increasing the amount of water in the sample mixture generally decreases the density of the mixture and results in decreased strength of the sample. In the samples including testing with a Manilla folder and/or cardboard, the noted material was placed on both sides of the sample. Such arrangement, with the core material flanked by a paper product, is comparable to conventional gypsum wallboard. As illustrated, the inclusion of paperboard on both sides, either in the illustrated form of Manilla folder or cardboard, significantly increased the sample's strength.

Example 6

Flexural Strength Testing III

A number of sample panels were formed according to the procedure outlined in Example 4, with the exceptions that strips of paper of the noted thickness to 2 inches wide by 11 inches long. One strip is placed in the mold cavity before pouring in the core matrix material. After pouring and leveling the mixture, another sheet of the same thickness is placed on top of the mixture. The mixture is covered with wire mesh and weighed down to keep it in place during drying. For the results listed below, the paper did not properly adhere to the core matrix, so the test results reflect samples having only one sheet of paper attached. The flexural strength tests were performed paper side down. Presumptively, the results would be higher for a sample including both facing sheets.

The core matrix material for each sample included 250 g Extendospheres, 40 g water, 220 g binder, 10 g foaming agent. The dry weight for each sample is 334.9. For paper having a thickness of 0.009", the weight to break was 6.6 kg. For paper having a thickness of 0.015", the weight to break was 7.5 kg. For paper having a thickness of 0.020", the weight to break was 5.2 kg.

Example 7

Additional Testing on Sample Boards

A number of sample panels were formed in accordance with the methods and compositions outlined in the previous Examples. Typically, a mixture such as that given above is cast in a mold comprising paper disposed above and below the core and a frame around the perimeter of the sample to contain the wet core material while it dries and cures. After drying and heating the wallboard sample can be tested for mechanical properties. The composition of each sample and the associated results are illustrated in Table 4.

Flexural Strength Testing—"Flex"

A 0.5 inch thick sample that is 2 inches wide by 6 to 8 inches long is placed on the test fixture and is thus suspended between two legs. The legs are approximately 4.25 inches apart. The test apparatus is equipped with the flexural test attachment, with the bar on the attachment situated parallel to the test specimen. The flexural test attachment is centered midway between the legs of the test fixtures. A bucket is hooked to the end of the test apparatus and weight is slowly added to the bucket until the test specimen fails. The weight of the bucket is measured to obtain the Flex results.

Nail Pull Resistance Testing

A 0.5 inch thick sample that is 6 inches wide by 6 inches long is drilled to have a 5/32 inch pilot hole in the center of the sample. The sample is placed on a nail pull fixture, with the pilot hole centered on the 2.5 inch diameter hole in the nail pull fixture. A nail is inserted into the pilot hole. The shank of the nail should be approximately 0.146 inches in diameter, and the head of the nail should be approximately 0.330 inches in diameter. A screw is inserted into the indicated hole on the test apparatus so that it sticks out a distance of approximately 2 inches. The head of the screw should be smaller than the head of the nail used in the test. The sample and fixture are positioned underneath the apparatus so that the centerlines of the nail and screw line up. A bucket is hooked to the end of the test apparatus. Weight is slowly added to the bucket until the test specimen fails. The weight of the bucket is measured.

Cure, End, and Edge Hardness Testing

A 0.5 inch thick sample that is 2 inches wide by 6 to 8 inches long is clamped in the vice of the testing equipment. A screw is inserted into the indicated hole on the test apparatus so that it sticks out a distance of approximately 1.5 inches. The head of the screw should be 0.235 inches in diameter. The vice and sample are positioned underneath the test apparatus, so that the head of the screw is centered on the 0.5 inch edge of the sample. A bucket is hooked to the end of the test apparatus. Weight is slowly added to the bucket until the screw penetrates at least 0.5 inches into the sample. If the screw slips off of the side and tears through the paper, the sample is discarded and the test is repeated.

TABLE 4

| Run | Cenospheres (g) | Organic Binder (g) | Foaming Agent (g) | Water (g) | Dry Weight (g) | Flex | Hardness | Nail Pull | Density |
|---|---|---|---|---|---|---|---|---|---|
| 1 | 50 | 75 | 0 | 20 | 78.73 | 30.3 | | | 10.5 |
| 2 | 50 | 75 | 0 | 20 | 78.73 | 41.6 | | | 7.9 |
| 3 | 50 | 75 | 0 | 20 | 78.73 | 24.7 | | | 7.7 |
| 4 | 50 | 75 | 1 | 0 | 78.73 | | | | |
| 5 | 50 | 75 | 2 | 0 | 78.73 | 17.6 | | | |
| 6 | 50 | 100 | 0 | 0 | 88.30 | 17.6 | | | 10.3 |
| 7 | 50 | 100 | 1 | 0 | 88.30 | 31.3 | 13.6 | 22.6 | |
| 8 | 50 | 100 | 1 | 0 | 88.30 | 16.3 | | | 6.8 |
| 9 | 50 | 100 | 1 | 0 | 88.30 | 19.4 | | | 6.3 |
| 10 | 50 | 100 | 2 | 0 | 88.30 | 16.6 | | | |
| 11 | 50 | 125 | 0 | 0 | 97.88 | 22.5 | | | 8.2 |
| 12 | 50 | 125 | 0 | 0 | 97.88 | 35.0 | | | 8.5 |
| 13 | 50 | 125 | 0 | 0 | 97.88 | 31.6 | | | 7.9 |
| 14 | 50 | 125 | 1 | 0 | 97.88 | 23.7 | | | 7.3 |
| 15 | 50 | 125 | 2 | 0 | 97.88 | 22.4 | | | 6.5 |
| 16 | 50 | 150 | 0 | 0 | 107.45 | 35.8 | 41.8 | 31.0 | 9.8 |
| 17 | 50 | 150 | 0 | 0 | 107.45 | 27.5 | | | 8.3 |
| 18 | 50 | 150 | 0 | 0 | 107.45 | 21.8 | | | 7.5 |
| 19 | 50 | 150 | 1 | 0 | 107.45 | 18.0 | | | 9.0 |
| 20 | 50 | 150 | 2 | 0 | 107.45 | 16.6 | | | 6.6 |
| Dry-wall average of 5 tests | | | | | | 30.9 | 38.0 | 53.6 | 10.4 |

Example 8

Test Results II

A sample of wallboard including 50 g Extendospheres, and 2 cc surfactant. The first type of wallboard tested included 100 g of sodium silicate binder mixture. The second type of wallboard tested included 75 g sodium silicate binder mixture and 25 g latex binder. The test boards had a thickness range from 0.386 inches to 0.671 inches. Testing was completed according to ASTM 473-3, 423, E119, and D3273-00 standards.

Flexural strength was tested and determined to be an average of 170 lbf (white side up) for the wallboard of the first type, based on three samples. The wallboard of the second type was found to average 101 lbf (white side down), based on three samples. The highest measurement of the six test samples was 197 lbf. A comparative conventional gypsum wall board was measured to be 107 lbf.

Edge hardness was determined to be an average of 15 lbf. The gypsum wall board had an average minimum edge hardness of 11 lbf. The sample showed a 36% improvement over the gypsum sample.

Nail pull resistance was measured to be 99 lbf, based on a 3 sample average. The gypsum wall board, on the other hand, measured a 77 lbf.

The thermal resistance of the sample wall board was tested. One side of the wall board was raised to 100° C. for two hours with no measurable temperature increase on the cool side of the sample.

The weight of the sample was compared to the conventional gypsum and found to be approximately 30% less than the gypsum board.

Example 9

Wallboard Formation

As another example of wallboard formation, a sodium silicate wallboard is formed by the following procedure. Sodium silicate is first foamed by adding 2 cc Steol FS 406 to 100 g sodium silicate solution (PQ Corporation O binder). The mixture is placed in a 6 inch diameter paint container. The mixture is mixed using a 3 inch diameter "Squirrel" mixer attached to a drill press running at 540 rpm. The operator rotates the paint container in the opposite direction than that of the mixer. The mixture is foamed for approximately one minute and fifteen seconds. The volume of the sodium silicate should at least double during the foaming process. 50 g of Extendospheres™ (having a size of 300 to 600 microns) are added to the mixture and mixed for one more minute with the "Squirrel" mixer. The vanished mix is then poured into the mold and smoothed with a paint stick.

Once the foamed mixture is smoothed in the mold, the mold is placed in an oven set at 85° C. The mixture is allowed to dry for approximately 12 hours at this temperature.

The backing paper is added to the core after the core has dried sufficiently. A light coat of sodium silicate is painted onto the back of the paper, and the paper is placed on the core matrix. The core and paper are covered on all sides by a polyester breather material and then placed in a vacuum bag. The vacuum bag is placed in an oven set at 85° C. and a vacuum is applied to the part. The part is allowed to dry for 45 minutes to one hour in the oven. The finished part is then removed from the oven and trimmed to desired size. Various materials can optionally be added to the core composition to accelerate drying.

Example 10

Wallboard Formation II

Another wallboard is produced according to the method in Example 9. The composition of the wallboard is altered in that 75 g of sodium silicate binder solution is used along with 25 g organic binder. The organic binder is added to the sodium silicate binder solution along with the Steol, prior to foaming.

Example 11

Wallboard Formation III

Another wallboard is produced by first masking a mold. A base board is lined with FEP. The FEP is wrapped tightly to reduce wrinkling on the surface. Boarder pieces of the mold are wrapped with Blue Flash Tape. Killer Red Tape is used to attached to border pieces to the base piece to form a border with an inside dimension of 14 inches by 18 inches.

500 g of microspheres (300-600 microns in size), 750 g "O" binder, 250 g organic binder, and 20 cc foaming agent are measured and set aside. The 0 binder and foaming agent are mixed using a Squirrel mixer at 540 RPM for about 2 minutes. The organic binder is added to the mixture and mixed for an additional 30 seconds. The microspheres are slowly added while mixing. When all microspheres are added, the mixture is mixed for an additional 30 seconds or until the mixture is uniform. The mixture is poured into the mold and leveled. The mold is additionally subjected to vigorous shaking for additional leveling. The mold is placed into an oven at 100° C. and dried for 12 to 18 hours until completely dry. Paper is applied to the sample by first cutting a piece of backing paper and a piece of facing paper slightly larger than the panel. An even coat of sodium silicate solution is applied to one side of the paper. The paper is placed on top and bottom surfaces of the panel and pressure is applied evenly across the surface. The pressure can optionally be applied by vacuum bagging the panel. The panel can be placed back in the oven at 100° C. for about 15 minutes until the paper is fully adhered to the surface of the panel.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based on the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given above.

What is claimed and desired to be secured by Letters Patent is:

1. A shear panel building material comprising:
   a first facing membrane and a second facing membrane, wherein the first facing membrane and the second facing membrane are independently selected from the group consisting of paper, metal and metal alloys;
   a rigid material situated between the first facing membrane and the second facing membrane, said rigid material being self-supporting; and
   a core matrix sandwiched between the first facing membrane and the second facing membrane, wherein the core matrix includes:
   from about 25 wt % to about 60 wt % of microspheres based on wet formulation, the microspheres having a size of from 100 to 1500 microns, wherein the microspheres are consisting of cenospheres, each cenosphere comprising an outer surface and a hollow interior filled with gas;

from about 20 wt % to about 36 wt % sodium silicate binder; and from about 5 wt % to about 15 wt % organic binder, wherein the microspheres are bonded together by the sodium silicate to create a plurality of voids between the microspheres, wherein the rigid material is held in place with respect to the first and second facing membranes by the core matrix.

2. A shear panel building material as in claim 1, wherein the rigid material is substantially the same height and length of the first facing membrane.

3. A shear panel building material as in claim 1, wherein the rigid material is a mesh.

4. A shear panel building material as in claim 1, wherein the rigid material is a continuous sheet.

5. A shear panel building material as in claim 4, wherein the continuous sheet has a thickness of about 2 to about 3 lbs/sq, yd.

6. A shear panel building material as in claim 1, wherein the core matrix further includes from about 2 wt % to about 6 wt % of a vinyl acetate.

7. A shear panel building material as in claim 1, wherein the microspheres are present in an amount from about 30 wt % to about 40 wt % of the wet mixture.

8. A shear panel building material as in claim 1, wherein the microspheres have a size of from about 200 to about 800 microns.

9. A shear panel building material as in claim 1, wherein the rigid material is selected from the group consisting of plastics, metals, metal alloys, fiberglass, Kevlar, nylon, graphite/composites, woven fabric, fiber sheets, and combinations thereof.

10. A shear panel building material as in claim 1, wherein the rigid material is quilted aluminum sheet.

11. A shear panel building material as in claim 1, comprising a plurality of rigid materials situated between the first facing membrane and the second facing membrane.

12. A shear panel building material as in claim 1, wherein the rigid material is configured to improve the shear panel building material's ability to counter effects of lateral loads by greater than about 10%.

13. A method of forming a shear panel building material according to claim 1, comprising:

combining the microspheres with from about 20 wt % to about 36 wt % sodium silicate binder and from about 5 wt % to about 15 wt % organic binder to form a mixture;

disposing a first part of the mixture between the first facing membrane and the rigid material;

disposing the second part of the mixture between the second facing membrane and the rigid material; and heat curing the mixture to form a core matrix.

14. A method as in claim 13, wherein the rigid material is a quilted sheet.

15. A method as in claim 13, further comprising disposing fibers in the mixture prior to disposing the mixture between the first and second facing membranes and the rigid continuous material.

* * * * *